(12) United States Patent  (10) Patent No.: US 8,378,967 B2
Noda et al.  (45) Date of Patent: Feb. 19, 2013

(54) WEARABLE ELECTRICAL APPARATUS

(75) Inventors: Saori Noda, Nagoya (JP); Kyo Yamamoto, Toyota (JP); Mitsuo Okumura, Aichi-gun (JP); Ichiro Akahori, Anjo (JP); Koji Hamada, Nisshin (JP)

(73) Assignee: DENSO CORPORATION, Kariya (JP)

( * ) Notice: Subject to any disclaimer, the term of this patent is extended or adjusted under 35 U.S.C. 154(b) by 437 days.

(21) Appl. No.: 12/656,661

(22) Filed: Feb. 12, 2010

(65) Prior Publication Data

US 2010/0220054 A1  Sep. 2, 2010

(30) Foreign Application Priority Data

Feb. 27, 2009 (JP) .................................. 2009-46635
Jun. 3, 2009 (JP) ................................ 2009-134040
Sep. 16, 2009 (JP) ................................ 2009-214758

(51) Int. Cl.
  *G09G 5/00* (2006.01)
(52) U.S. Cl. ...................... 345/156; 345/174; 178/18.07
(58) Field of Classification Search .......... 345/156–178; 341/20–35; 178/18.01–18.09
See application file for complete search history.

(56) References Cited

U.S. PATENT DOCUMENTS

| 6,380,923 | B1 * | 4/2002 | Fukumoto et al. ............ 345/156 |
| 7,569,762 | B2 * | 8/2009 | Baum et al. .................... 84/626 |
| 2006/0149737 | A1 | 7/2006 | Du et al. |
| 2008/0072691 | A1 * | 3/2008 | Gruber .......................... 73/865.4 |

FOREIGN PATENT DOCUMENTS

| JP | A-H07-121294 | 5/1995 |
| JP | A-2000-148396 | 5/2000 |
| JP | A-2004-199145 | 7/2004 |
| JP | A-2006-302204 | 11/2006 |
| JP | A-2008-197801 | 8/2008 |

OTHER PUBLICATIONS

Office Action mailed Aug. 8, 2011 in corresponding CN application No. 201010124451.8 (and English translation).
U.S. Appl. No. 12/656,662, filed Feb. 12, 2010, Asami et al.
Office Action mailed on May 10, 2011 from the Japan Patent Office in the corresponding patent application No. 2009-134040 (English translation enclosed).
U.S. Appl. No. 12/656,735, filed Feb. 16, 2010, Niwa et al.

* cited by examiner

*Primary Examiner* — Amare Mengistu
*Assistant Examiner* — Koosha Sharifi-Tafreshi
(74) *Attorney, Agent, or Firm* — Posz Law Group, PLC

(57) ABSTRACT

A wearable input device includes a pair of ring-shaped signal electrodes and a current sensor arranged in parallel in the direction of the axis of a finger. The current sensor is provided outside an area sandwiched between the signal electrodes. An alternating current signal is applied between the signal electrodes. When the top end of the finger with this device worn thereon is brought into contact with any other body site, a current flows through the current measure point of the current sensor. When the top end of the finger is not in contact with any other body site, no current flows through the measurement point of the current sensor. Based on the measured current, it is determined whether the finger is in contact with any other body site. A command is outputted to an external device according to the result of the determination.

13 Claims, 24 Drawing Sheets

FIG. 19A
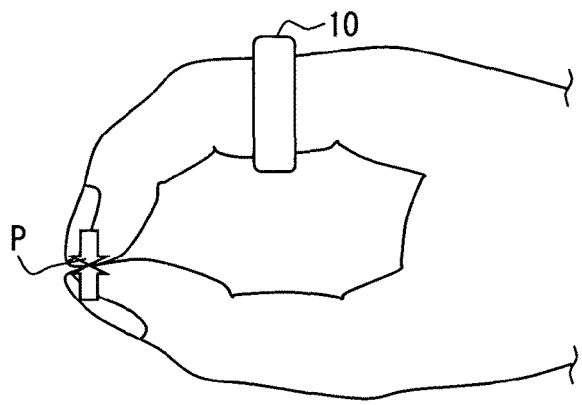
FIG. 19B
| MEASURED PARAMETER | CONTACT PRESSURE P | |
|---|---|---|
| | INCREASE | DECREASE |
| CURRENT I | INCREASE | DECREASE |
| VOLTAGE V | INCREASE | DECREASE |
| PHASE DELAY Δθ | INCREASE | DECREASE |
| IMPEDANCE Z | DECREASE | INCREASE |
FIG. 20A
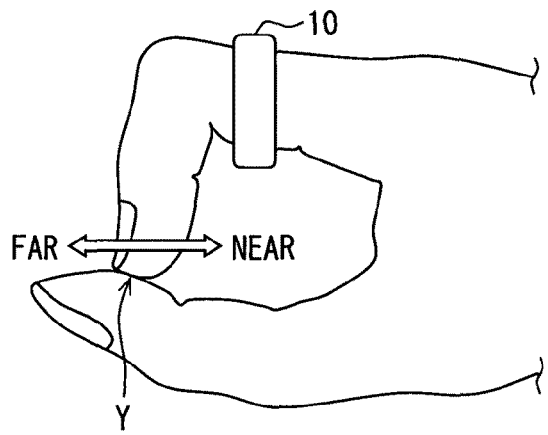
FIG. 20B
| MEASURED PARAMETER | CONTACT POSITION Y | |
|---|---|---|
| | FAR | NEAR |
| CURRENT I | DECREASE | INCREASE |
| VOLTAGE V | DECREASE | INCREASE |
| PHASE DELAY Δθ | INCREASE | DECREASE |
| IMPEDANCE Z | INCREASE | DECREASE |

FIG. 31A
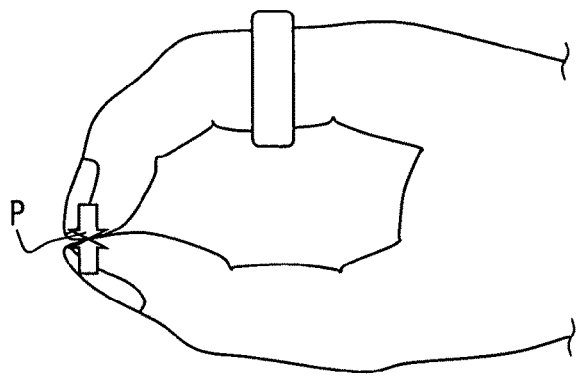
FIG. 31B
| MEASURED PARAMETER | CONTACT PRESSURE P | |
|---|---|---|
| | INCREASE | DECREASE |
| VOLTAGE V | INCREASE | DECREASE |
| CURRENT I | INCREASE | DECREASE |
| IMPEDANCE Z | DECREASE | INCREASE |
| POWER W | INCREASE | DECREASE |
FIG. 32A
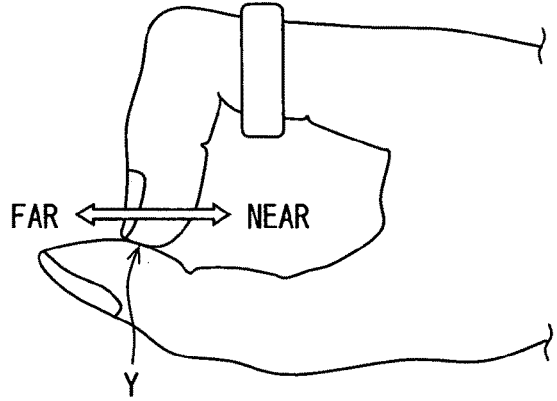
FIG. 32B
| MEASURED PARAMETER | CONTACT POSITION Y | |
|---|---|---|
| | FAR | NEAR |
| VOLTAGE V | DECREASE | INCREASE |
| CURRENT I | DECREASE | INCREASE |
| IMPEDANCE Z | INCREASE | DECREASE |
| POWER W | DECREASE | INCREASE |

WEARABLE ELECTRICAL APPARATUS

CROSS REFERENCE TO RELATED APPLICATION

This application is based on and incorporates herein by reference Japanese Patent Applications No. 2009-46635 filed on Feb. 27, 2009, No. 2009-134040 filed on Jun. 3, 2009 and No. 2009-214758 filed on Sep. 16, 2009.

FIELD OF THE INVENTION

The present invention relates to a wearable electrical apparatus worn on a user's body when used.

BACKGROUND OF THE INVENTION

As a wearable electrical apparatus worn on a user's body when used, an input interface worn on a finger is known.

For example, one conventional interface (for example, patent document 1) has a ring-shaped base worn on a user's forefinger, a circumferentially long touch pad for vertical scrolling and a tact switch for horizontal scrolling adjacent to the touch pad. In this input interface, the touch pad and the tact switch are operated by the thumb adjacent to the forefinger, on which the base is worn.

Another conventional input interface (for example, patent document 2) is configured to be capable of detecting keying operation on an arbitrary supporting body, such as a desk. This input interface analyzes timing, with which a user taps the supporting body at his/her finger tips to determine input information based on a detection signal from a detector, such as impact sensor, sound sensor, acceleration sensor, myoelectric sensor, or the like.

Patent document 1: JP 2006-302204A
Patent document 2: JP H7-121294A

However, according to the input interface of patent document 1, for example, it is required to operate the small-sized touch pad and tact switch fit on the forefinger by the thumb, and this degrades the operability of the input interface. Further, it is required to finely and accurately move the thumb.

The input interface according to patent document 2 is so designed as to determine input information by detecting the action of tapping the supporting body by a user. Therefore, although it can be utilized in keyboard entry and the like, in which tapping operation is mainly performed, it cannot detect any other operation than tapping, such as long-time pressing. As a result, its input pattern is limited and it is unsuitable for other applications.

SUMMARY OF THE INVENTION

It is an object of the invention to provide a wearable electrical apparatus, which can detect a user's body movement.

According to one aspect of the present invention, a wearable electrical apparatus is provided with a signal supply section, a measuring section and a detecting section.

The signal supply section has a pair of signal electrodes wearable along a conductor path on a body surface of a user where a closed annular conductor path is formed by contact of two body sites that are brought into or out of contact with each other through the body surface, and configured to apply an electrical signal to the body site formed between the pair of signal electrodes so that a first closed ring formation site and a second ring formation site are formed, the first closed ring formation site being formed between the pair of the signal electrodes with intervention of a point of contact between the two body sites in a path along the conductor path when the two body sites are in contact with each other, and the second ring formation site being formed as the body site sandwiched between the pair of signal electrodes without the intervention of the point of contact.

The measuring section measure a physical parameter quantity of an electrical signal, which is one of a current flowing in the first closed ring formation site, a voltage at a specific point in the first closed ring formation site, a phase delay, and an impedance of the body site sandwiched between the pair of measurement electrodes.

The detecting section detects that the two body sites are brought into or out of contact with each other by user's body movement based on a measurement value of physical parameter quantity.

According to a second aspect of the present invention, a wearable electrical apparatus is provided with a signal supply section, a measuring section and a detection section.

The signal supply section has an annular magnetic body and a signal supply unit. The annular magnetic body is formed of an annular core and a coil wound around the annular core and provided as an annular body wearable on a body site of a user where a closed annular conductor path is formed by contact of two body sites that are brought into or out of contact with each other through a body surface so that a direction of circumference thereof is orthogonal to a direction of circumference of the conductor path. The signal supply unit supplies a current to the coil to produce a magnetic field in the direction of the circumference of the annular core and thereby producing an electrical signal in the direction of the circumference of the conductor path by electromagnetic induction with the conductor path formed.

The measuring section measures a physical parameter quantity of an electrical signal, which is one of a voltage between a pair of electrodes, a current flowing in the direction of the circumference of the conductor path in the body site, an impedance of the coil and electric power consumption of the coil.

The detecting section detects that the two body sites are brought into or out of contact with each other by user's body movement based on a physical parameter quantity of the electrical signal measured by the measuring section.

BRIEF DESCRIPTION OF THE DRAWINGS

The above and other objects, features and advantages of the present invention will become more apparent from the following detailed description made with reference to the accompanying drawings. In the drawings:

FIG. 19A is a schematic view showing a manner in which fingers are brought into contact with each other in the first to sixth embodiments;

FIG. 19B is a table showing the correspondence between pressure and measurement value obtained when the fingers are brought into contact with each other;

FIG. 20A is a perspective view showing a manner in which a finger is slid on another finger; and FIG. 20B is a table showing the correspondence between the direction of slide and measurement value obtained when the finger is slid on the other finger.

FIG. 31A is a schematic view showing a manner, in which fingers are brought into contact with each other in the tenth embodiment;

FIG. 31B is a table showing the correspondence between pressure and measurement value obtained when the fingers are brought into contact with each other in the tenth embodiment;

FIG. 32A is a schematic view showing a manner, in which a finger is slid on another finger in the tenth embodiment; and FIG. 32B is a table showing the correspondence between the direction of slide and measurement value obtained when the finger is slid on the other finger in the tenth embodiment.

DETAILED DESCRIPTION OF THE PREFERRED EMBODIMENTS

The present invention will be described in detail with reference to a number of embodiments shown in the accompanying drawings.

First Embodiment

Figure 1A:
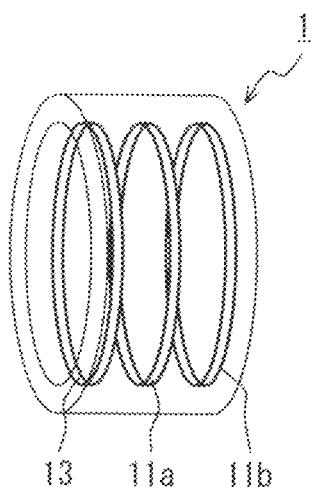
FIG. 1A is a perspective view showing a first wearable input device according to a first embodiment of the present invention.
Figure 1B:
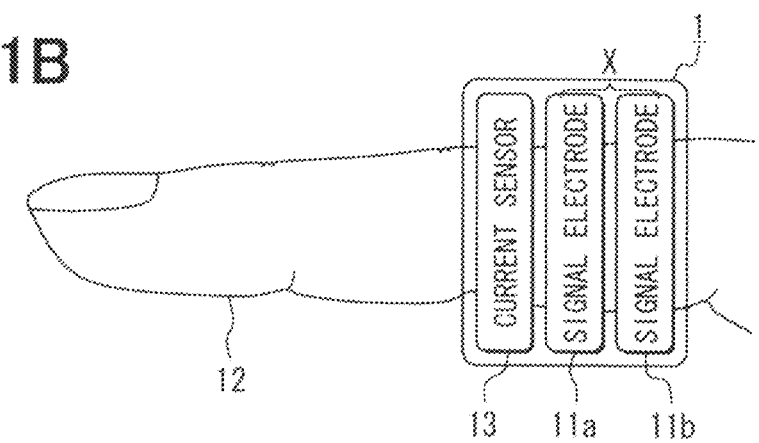
FIG. 1B is a schematic view showing arrangement of electrodes and the like of the first wearable input device.

Referring to FIGS. 1A and 1B, a first wearable input device 1 includes a pair of signal electrodes 11a, 11b and a current sensor 13. Each signal electrode 11a, 11b is ring-shaped. The signal electrodes 11a, 11b and the current sensor 13 are arranged in parallel at predetermined intervals along the axial line of a user's finger 12. The current sensor 13 is provided outside the area X sandwiched between the signal electrodes 11a, 11b.

The current sensor 13 is positioned between the signal electrodes 11a, 11b and the finger tip, that is, at the left side of the signal electrodes 11a, 11b. Instead, the current sensor 13 may be positioned between the signal electrodes 11a, 11b and the base of the finger, that is, at the right side of the signal electrodes 11a, 11b. That is, when the first wearable input device 1 is used, the first wearable input device 1 can be worn in either orientation.

Figure 2A:
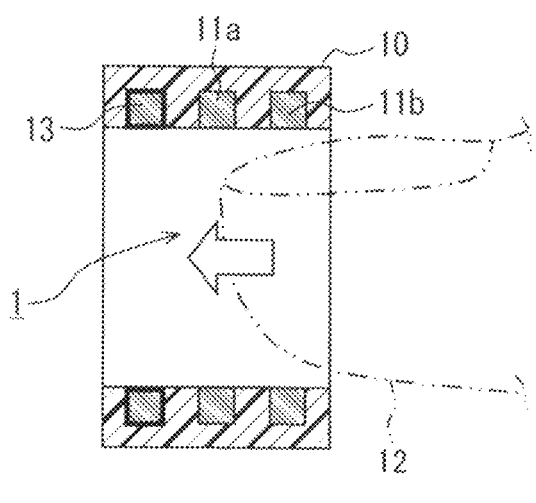
FIG. 2A is a schematic sectional view of the first wearable input device.
Figure 2B:
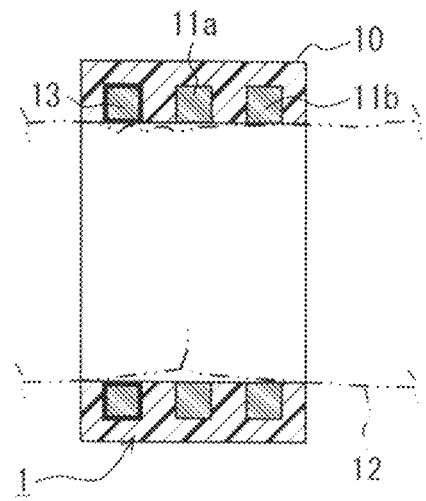
FIG. 2B is another schematic sectional view of the first wearable input device.

As shown in FIGS. 2A and 2B, the pair of signal electrodes 11a, 11b and the current sensor 13 are provided in a finger ring body 10 made of resin as an annular body, which forms the outer shape of the first wearable input device 1. They are integrated but electrically insulated from each other in the finger ring body 10. The signal electrodes 11a, 11b are housed in the finger ring body 10 with their inner surfaces facing inward of the ring exposed from the finger ring body 10, so that when the first wearable input device 1 is worn on a finger, the signal electrodes 11a, 11b are brought into contact with the user's body surface (finger skin surface).

The current sensor 13 is so configured that, when a voltage is applied to the signal electrodes 11a, 11b, the current flowing in the direction of the axis of a body site (finger) where the first wearable input device 1 is worn is measured by utilizing a magnetic field (magnetic flux) produced by a current, which flows in the direction of the axis of the body site.

Figure 5:
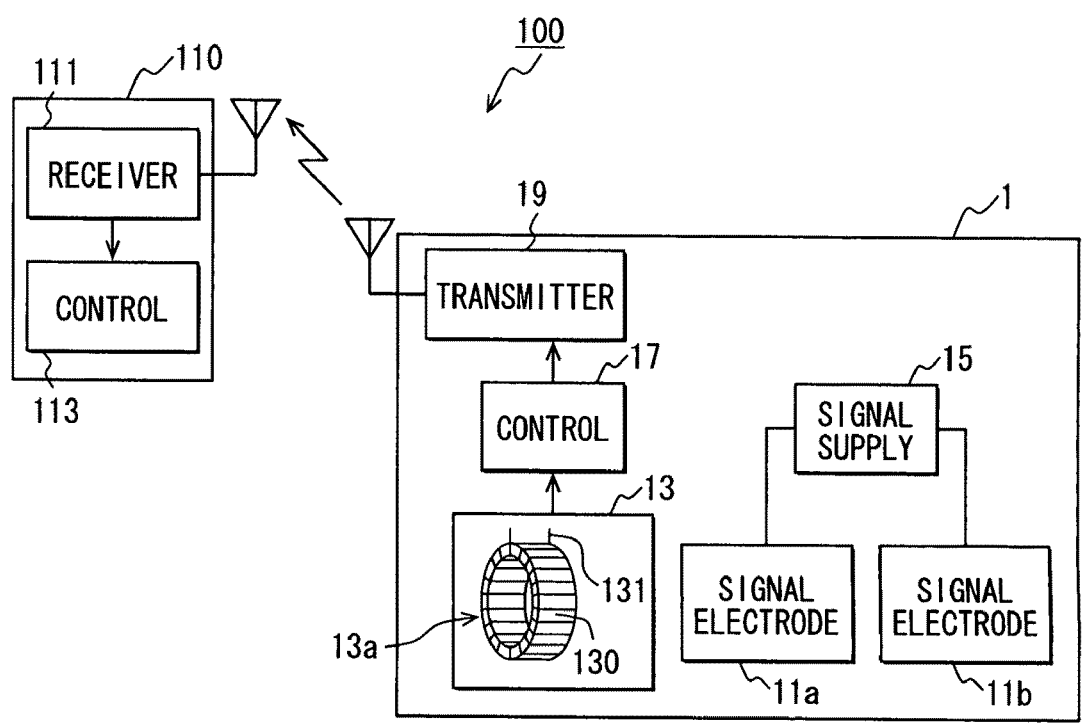
FIG. 5 is a block diagram showing in detail the configurations of the first wearable input device and a remote operation system.

As shown in detail in FIG. 5, the current sensor 13 includes a current transformer 13a, in which a coil 131 is wound on a core 130. The current sensor measures the current flowing in the direction of the axis of the body site (finger) encircled with the current transformer 13a based on a voltage produced between the ends of the coil 131 of the current transformer 13a by electromagnetic induction.

The current sensor 13 is so configured as described above, because alternating current (AC) signals are applied to the signal electrodes 11a, 11b in the first wearable input device 1. However, direct current (DC) signals may be applied between the signal electrodes 11a, 11b. In this case, the current sensor 13 may be formed of a Hall element. For example, the current sensor 13 can be configured as a sensor, in which a Hall element is placed in a cut formed in an annular core. The current, which flows in the direction of the axis of the body site (finger) can be measured by the Hall element based on a magnetic field produced between the ends of the core comprising the cut.

The principle of operation of the first wearable input device 1 is described with reference to FIGS. 3A and 3B.

When the top end of a finger with the first wearable input device 1 worn thereon is brought into or out of contact with another body site of the same user, it is detected and the result of this detection is converted into input information for an external device 110 shown in FIG. 5.

Figure 3A:
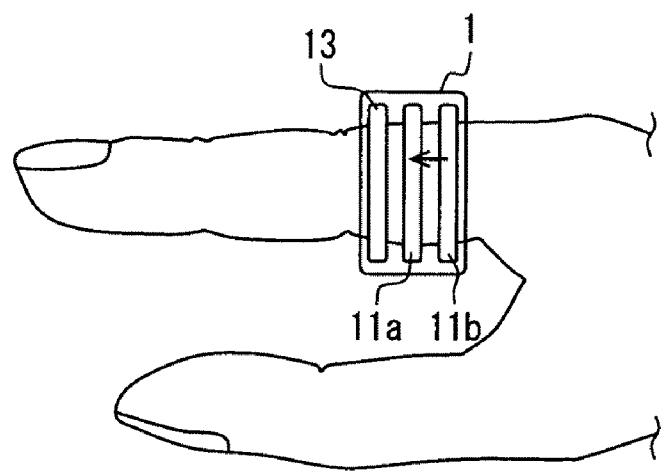
FIG. 3A is a schematic view showing an example of use of the first wearable input device.
Figure 3B:
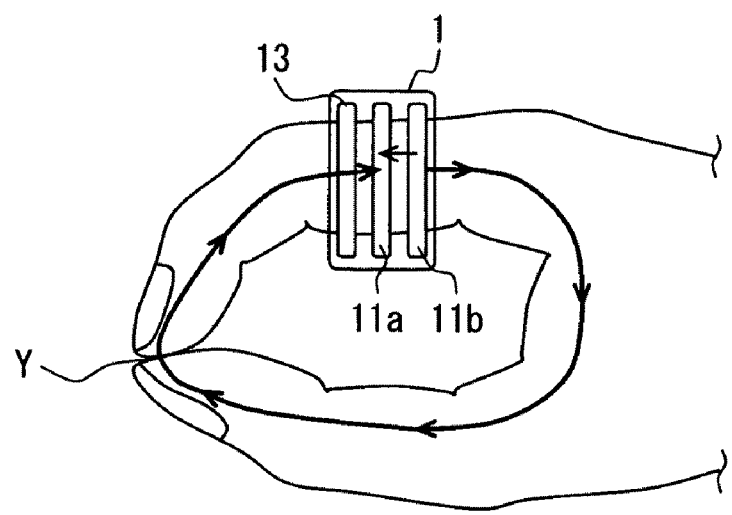
FIG. 3B is a schematic view showing the principle of operation of the first wearable input device.

It is assumed that the first wearable input device 1 is worn on a forefinger as shown in FIGS. 3A and 3B and the forefinger and the thumb are brought into or out of contact with each other by the user's body movement.

In this case, when the forefinger and the thumb are out of contact with each other (FIG. 3A), even when a signal is applied between the signal electrodes 11a, 11b, the supplied signal basically flows only through the body site sandwiched between the signal electrodes 11a, 11b. The current sensor 13 does not detect any current flowing therethrough and the measured current value is zero. The above body site is equivalent to the area X indicated in FIG. 1B.

Figure 4A:
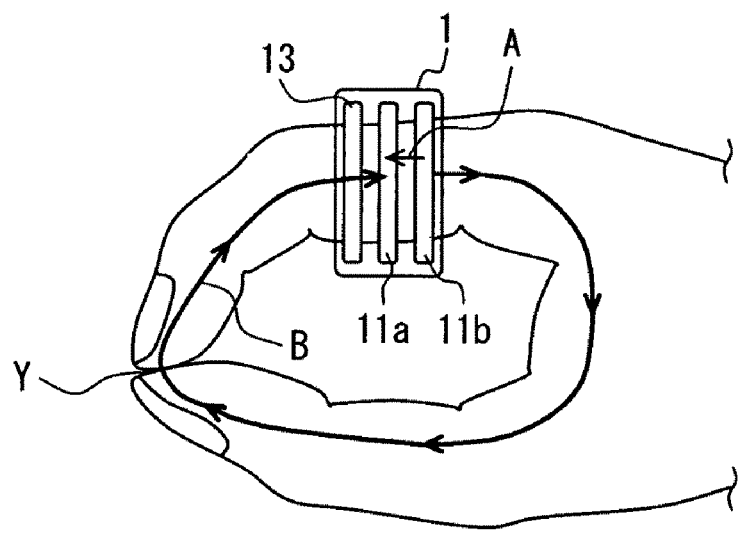
FIG. 4A is a schematic view showing the principle of operation of a measurement system of the first wearable input device.

When the forefinger and the thumb are in contact with each other (FIGS. 3B and 4A), a closed annular conductor path is formed of the forefinger, the thumb, and the body site that connects the thumb and the forefinger at the base of these fingers. In this case, the current sensor 13 is electrically sandwiched between the signal electrodes 11a, 11b through a point of contact Y formed between the thumb and the forefinger. As a result, a supplied signal flows to the measure point of the current sensor 13 and the measured current value (effective value) of the current sensor 13 becomes larger than zero.

Thus, it is detected whether fingers are bought into or out of contact with each other by the user's body movement based on the measured current value of the current sensor 13.

Figure 4B:
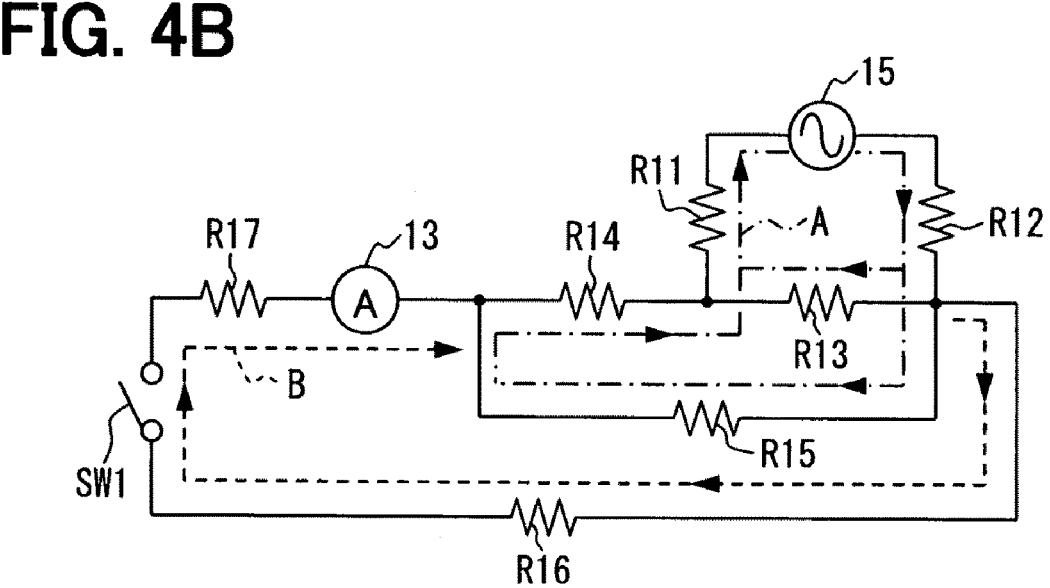
FIG. 4B is an equivalent circuit diagram of the measurement system of the first wearable input device.

FIG. 4B is an equivalent circuit diagram of the measurement system of the first wearable input device 1. The resistance of a body site through which an alternating current signal applied at the signal electrodes 11a, 11b flows is expressed by a lumped parameter system for the sake of simplicity of explanation.

Resistance R11 indicated in FIG. 4B represents the contact resistance between the signal electrode 11a and the finger. Resistance R12 represents the contact resistance between the signal electrode 11b and the finger. Resistance R13 represents the electrical resistance of the surface of the body site corresponding to the area X (FIG. 1) sandwiched between the signal electrodes 11a, 11b. Resistance R14 represents the electrical resistance of the surface of the body site extended from the measure point of the current sensor 13 to the signal electrode 11a.

Resistance R15 represents the electrical resistance of the flow path (body's interior) of an electrical signal that flows through the body's interior between the signal electrode 11a and the current sensor 13 and is propagated between the signal electrodes 11a, 11b. Resistance R16 represents the electrical resistance of a body site extended from the signal electrode 11b to the top end of the thumb. Resistance R17 represents the electrical resistance of a body site extended from the top end of the forefinger to the measure point of the current sensor 13. A switch SW1 represents a condition at the point Y between the forefinger and the thumb, that is, the forefinger and the thumb are in (ON) or out (OFF) of contact with each other. The current sensor 13 is indicated as an ammerter.

The alternate long and short dash line in FIG. 4B indicates the flow of an electrical signal A, which flows only in the area X between the signal electrodes 11a, 11b regardless of whether the forefinger and the thumb are in or out of contact with each other. The broken line indicates the flow of an electrical signal B, which flows between the signal electrodes 11a, 11b when the forefinger and the thumb are in contact with each other. The flow direction of the signal B is opposite to that of the signal A.

When the first wearable input device 1 is worn on the forefinger and the forefinger is brought into or out of contact with the thumb, the mode of flow of electrical signals changes as described above. The measured value of current detected at the current sensor 13 is also varied. The first wearable input device 1 in this embodiment detects that fingers are brought into or out of contact with each other by a user's body movement based on measurement values varying as described above.

The top end of a forefinger with the first wearable input device 1 worn thereon is brought into or out of contact with a thumb is taken up as an example. The top end of the forefinger with the first wearable input device 1 worn thereon need not be brought into contact with the thumb. It may be brought into contact with the middle finger, the palm of the other hand, or the trunk of the body. Even when such body movement is carried out, the same current change occurs in proximity to the current sensor 13. It is thus detected whether two body sites are in or out of contact with each other.

That is, a user can utilize the first wearable input device 1 to operate an external device by bringing a body site outside (finger tip side) of a body site where the first wearable input device 1 is worn into or out of any other body site.

The first wearable input device 1 may be provided as a part of a remote operation system 100 as shown in FIG. 5.

As shown in FIG. 5, the first wearable input device 1 includes, in addition to the pair of signal electrodes 11a, 11b and the current sensor 13, a signal supply unit 15, a control unit 17, and a radio transmitter unit 19.

The signal supply unit 15 applies an alternating current signal (alternating-current voltage) to the body site sandwiched between the signal electrodes 11a, 11b and is constant-voltage-driven or constant-current-driven. The supplied signal may be a triangular wave signal, a sine wave signal, a rectangular wave signal, a sawtooth wave signal, or the like.

The current sensor 13 measures a current flowing in the direction of the axis of the body site (finger) encircled with the annular current transformer 13a and inputs the resulting measured current value to the control unit 17.

Figure 6A:
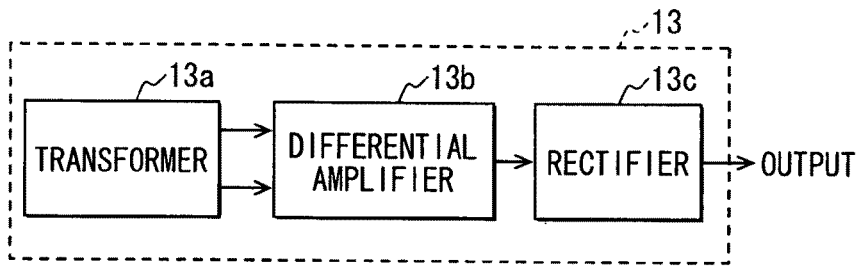
FIG. 6A is a block diagram showing in detail one example of a current sensor of the first wearable input device.

In addition to the current transformer 13a, as shown in FIG. 6A, the current sensor 13 includes a differential amplifier circuit 13b and a rectifier 13c. The differential amplifier circuit 13b is connected to both ends of the coil 131 of the current transformer 13a, amplifies the difference between signals inputted from both ends of the coil 131, and outputs the resulting amplified signal. The rectifier 13c rectifies the output signal (alternating current signal) of the differential amplifier circuit 13b and converts it into a direct current signal. The current sensor 13 thus outputs an output signal from the rectifier 13b as a measured current value.

The effective value of voltage produced across the coil 131 of the current transformer 13a is converted into the measured value and outputted from the current sensor 13. This measured value (effective value) indicates a current flowing in the direction of the axis of the body site on which the current transformer 13a is worn.

Figure 6B:
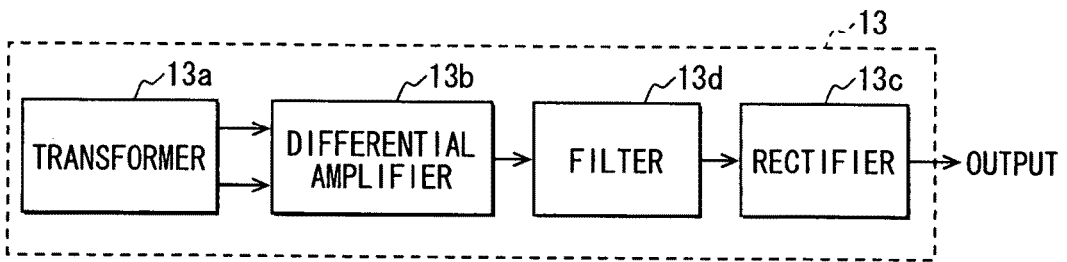
FIG. 6B is a block diagram showing in detail another example of the current sensor of the first wearable input device.

In the current sensor 13, the difference between signals inputted from both ends of the coil 131 is amplified by the differential amplifier circuit 13b. Therefore, common mode noise inputted from both ends of the coil 131 can be cut out. However, it is more desirable that, as shown in FIG. 6B, a filter 13d for passing only signals of the same frequency as that of signals applied between the signal electrodes 11a, 11b should be provided between the differential amplifier circuit 13b and the rectifier 13c. Thus the current sensor 13 can remove noise that cannot be removed even by the differential amplifier circuit 13b.

Figure 6C:
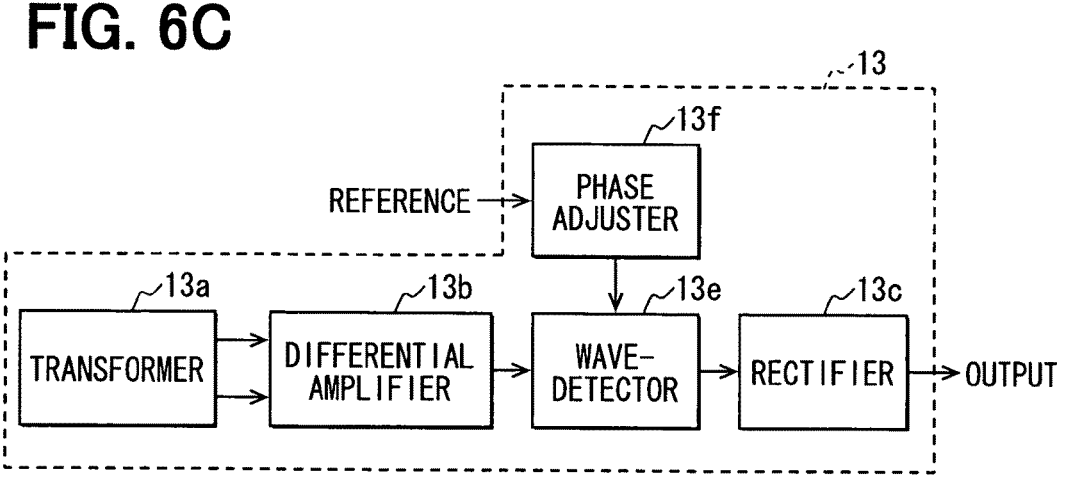
FIG. 6C is a block diagram showing in detail a further example of the current sensor of the first wearable input device.

Alternatively, as shown in FIG. 6C, the current sensor 13 may be provided with a synchronous wave-detector 13e and a phase adjuster 13f between the differential amplifier circuit 13b and the rectifier 13c. Synchronous wave-detection is carried out by the synchronous wave-detector 13e using as a reference signal a signal applied between the signal electrodes 11a, 11b. The output signal of the synchronous wave-detector 13e is inputted to the rectifier 13c and the measured current value is outputted. With the current sensor 13 configured as described above, even when the output frequency of a supplied signal changes, it can be dynamically coped with to remove a noise signal. It is advisable that the phase of the reference signal should be regulated by the phase adjuster 13f as required.

The control unit 17 determines whether fingers are in or out of contact with each other based on a measured current value inputted from the current sensor 13. Then the control unit 17 inputs a command based on the result of this determination to the radio transmitter unit 19 as an actuating signal for an external device 110, which forms a part of the remote operation system 100 with the first wearable input device 1.

Figure 7A:
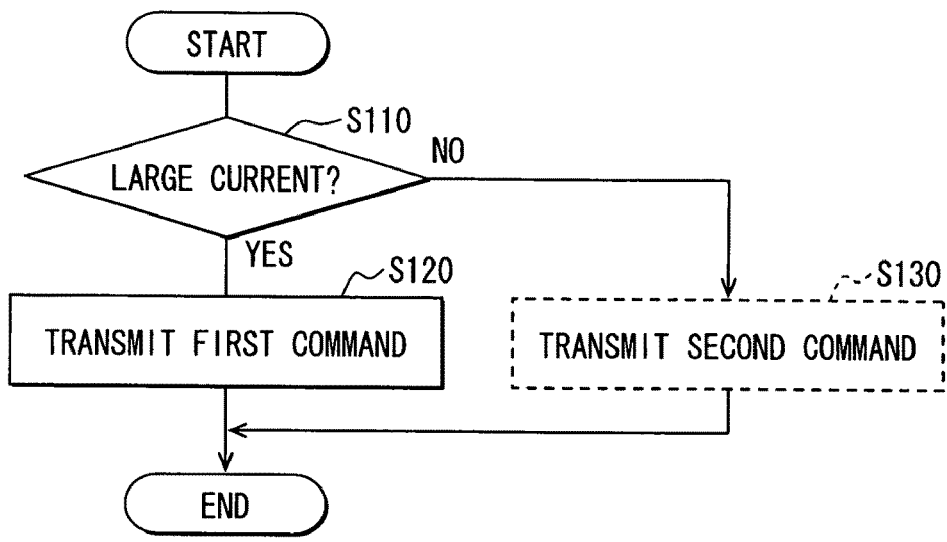
FIG. 7A is a flowchart showing processing carried out by a control unit in the first embodiment.

The control unit 17 may be so configured as to periodically and repeatedly carry out, for example, the processing shown in FIG. 7A. Specifically, it is checked whether or not the measured current value inputted from the current sensor 13 is large, that is, higher than a predetermined threshold value (S110). If it is determined that the measured current value is higher than the predetermined threshold value (Yes at S110), it is determined that the fingers are in contact with each other. Then a predetermined first command is transmitted to the external device 110 through the radio transmitter unit 19 (S120). The first command is supposed to be transmitted to the external device 110 when the fingers are brought into contact with each other. If it is determined that the measured current value inputted from the current sensor 13 is small, that is, equal to or lower than the predetermined threshold value (No at S110), it is determined that the fingers are out of contact with each other. Then a predetermined second command is transmitted to the external device 110 through the radio transmitter unit 19 (S130). The second command is supposed to be transmitted to the external device 110 when the fingers are brought out of contact with each other. The control unit 17 may be so configured that the processing of S130 is not carried out.

The external device 110 includes a radio receiver unit 111 and a control unit 113. It receives the above commands wirelessly transmitted from the first wearable input device 1 through the radio receiver unit 111 and carries out processing corresponding to the commands at the control unit 113. For example, the external device 110 may be so configured as to output a picture signal representing that something is grabbed or released in a virtual space through a display screen (not shown) based on a command inputted from the first wearable input device 1.

Figure 7B:
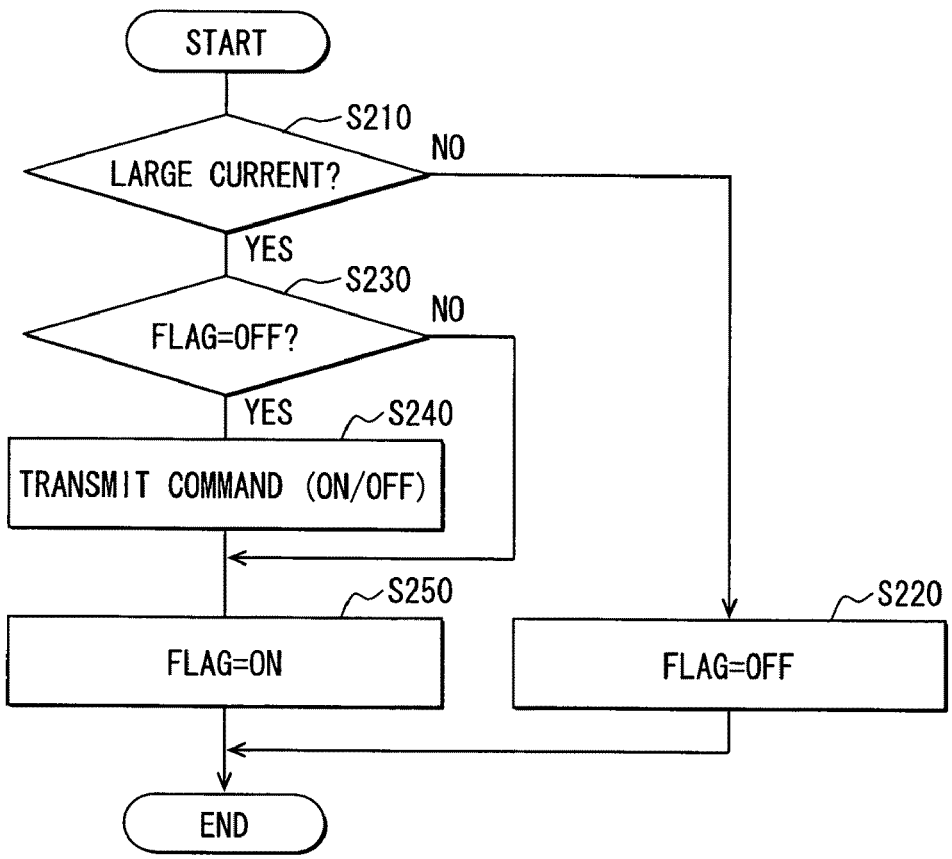
FIG. 7B is another flowchart showing processing carried out by the control unit in the first embodiment.

The control unit 17 may alternatively be so configured as to periodically and repeatedly carry out the processing shown in FIG. 7B.

Specifically, it is checked whether or not a measured current value inputted from the current sensor 13 is large, that is, higher than a predetermined threshold value (S210). If the measured current value is equal to or lower than the predetermined threshold value (No at S210), a status flag indicating whether fingers are in or out of contact with each other is set to off (S220). This indicates that the fingers are out of contact with each other. If it is determined that the measured current value is higher than the predetermined threshold value (Yes at S210), it is checked whether or not the status flag is in the off state (S230). This is for checking whether or not the fingers have been just brought into contact with each other. If the status flag is in the off state (Yes at S230), that is, the finger contact condition is changed this time from the non-contact condition (off) to the contact condition (on), a predetermined command to turn on/off the power supply to the external device 110 is outputted through the radio transmitter unit 19 to remotely operate the external device 110 (S240). Then the setting of the status flag is changed to on to indicate that the fingers are in contact with each other (S250). If the status flag is in the on state (No at S230), the command is not transmitted and the status flag is kept in the on state.

With the control unit 17 configured as described above, the power supply to the external device 110 can be turned on/off just by, for example, bringing a forefinger and a thumb into contact with each other.

The control unit 17 may be so configured that the time period, for which the measured current value is higher than the predetermined threshold value, is measured to measure the time of contact between fingers, and commands to be inputted to the external device 110 are changed according to the contact time of fingers. Alternatively, the control unit 17 may be so configured that a pattern, in which fingers are brought into or out of contact with each other, is recorded and a command corresponding to the inputted pattern is outputted to the external device 110. The algorithm for determining a command to be inputted the external device 110 based on the measured current value inputted from the current sensor 13 can be modified as appropriate.

Figure 8A:
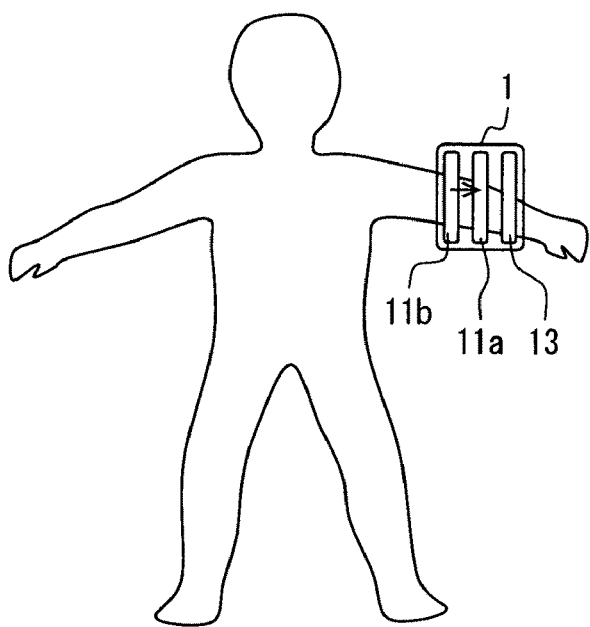
FIG. 8A is a schematic view showing an example, in which the first wearable input device is used as an armlet.
Figure 8B:
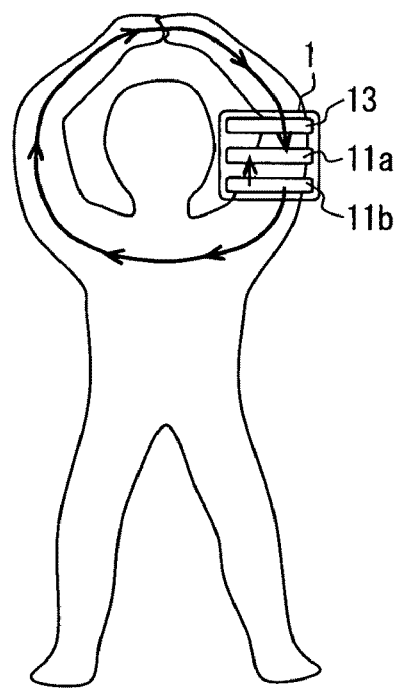
FIG. 8B is a schematic view showing the example, in which the first wearable input device is used as an armlet.

In this embodiment, the first wearable input device 1 is formed in the finger ring shape so that it is worn on a finger. However, the first wearable input device 1 may be increased in sized and formed in an armlet shape so that it may be worn on an arm as shown in FIGS. 8A and 8B. In this case, the external device 110 can be remotely operated by the action of bringing both hands into or out of contact with each other as shown in FIGS. 8A and 8B.

In the first embodiment, the pair of signal electrodes 11a, 11b, the signal supply unit 15, and the line connecting the signal electrodes 11a, 11b and the signal supply unit 15 correspond to a signal supply section. In the case of the example shown in FIGS. 3A and 3B, the body site extended from the signal electrode 11b to the base of the forefinger, the body site extended from the base of the forefinger to the top end of the thumb, and the body site extended from the top end of the thumb with which the top end of the forefinger is brought into contact to the signal electrode 11a correspond to a first closed ring formation site. The body site in the area X sandwiched between the signal electrodes 11a, 11b corresponds to a second closed ring formation site. The current sensor 13 corresponds to a measuring section. The control unit 17 (especially, the processing of S110 or S210 carried out by the control unit 17) corresponds to a detecting section. The processing of S120, S130, S240, and the like carried out by the control unit 17 corresponds to an actuating signal outputting section.

Second Embodiment

Figure 9A:
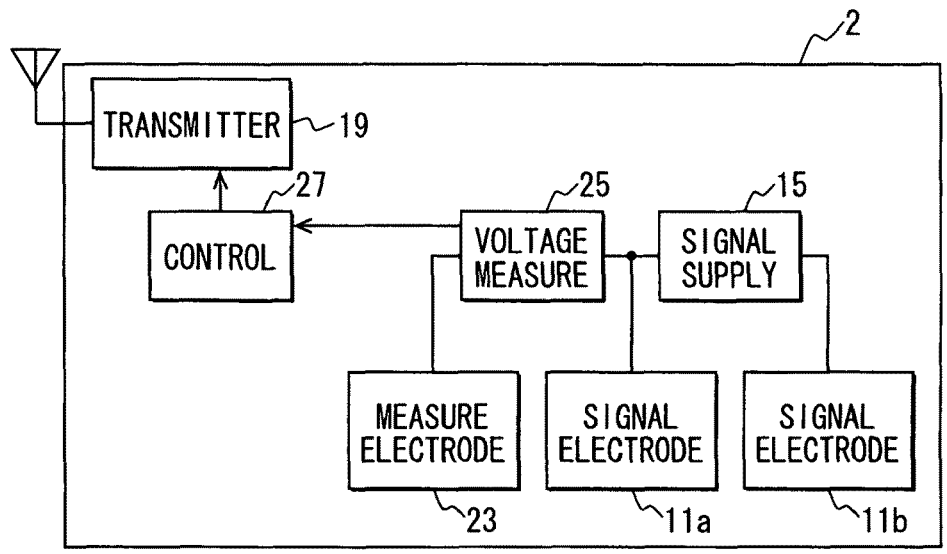
FIG. 9A is a block diagram showing a second wearable input device according to a second embodiment of the present invention.
Figure 9B:
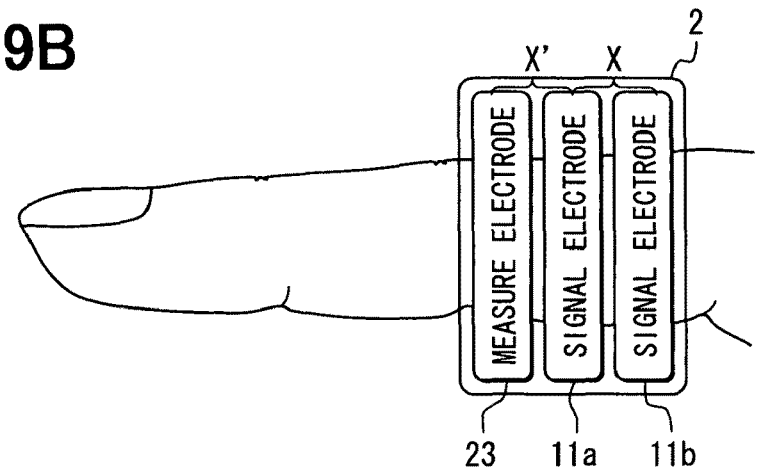
FIG. 9B is a schematic view showing arrangement of electrodes and the like of the second wearable input device.

A second wearable input device 2 is shown in FIGS. 9A and 9B as a second embodiment. The second wearable input device 2 is different from the first wearable input device 1 only in that voltage measurement is carried out instead of the current measurement. With respect to the second wearable input device 2, therefore, the same constituent elements as in the first embodiment will be denoted with the same reference numerals and the description thereof will be simplified.

As shown in FIGS. 9A and 9B, the second wearable input device 2 includes a pair of signal electrodes 11a, 11b, a measurement electrode 23 similarly formed in a ring-shape. These electrodes are arranged in parallel at predetermined intervals along the axial line of a finger. Thus, the second wearable input device 2 includes the measurement electrode 23 in place of the current sensor 13.

Similarly to the current sensor 13, this measurement electrode 23 is provided so that it is positioned in an area external to the area X sandwiched between the signal electrodes 11a, 11b. Similarly to the signal electrodes 11a, 11b, the measurement electrode is housed in the finger ring body 10 so that, when the second wearable input device 2 is worn on a finger, the inner surface facing inward of the ring is exposed from the finger ring body so that the measurement electrode 23 is also brought into contact with a user's body surface (finger surface).

The second wearable input device 2 further includes a voltage measurement unit 25 and a control unit 27 in addition to the signal supply unit 15 and the radio transmitter unit 19. The alternating current signal is applied between the signal electrodes 11a, 11b by the signal supply unit 15 as in the first embodiment. Meanwhile, voltage (effective value) produced between the signal electrode 11a and the measurement electrode 23 is measured by the voltage measurement unit 25 and the resulting measured voltage value is inputted to the control unit 27.

The control unit 27 determines the finger condition based on the measured voltage value inputted from the voltage measurement unit 25. If the measured voltage value is higher than a predetermined threshold value, the control unit 27 determines that the finger is in contact. If the measured voltage value is equal to or lower than the predetermined threshold value, the control unit 27 determines that the finger is out of contact.

Specifically, the control unit 27 may be so configured as to carry out processing, in which the measured current check at S110 (or S210) in FIG. 7A or 7B is replaced with a measured voltage check, that is, checking whether or not a measured voltage value inputted from the voltage measurement unit 25 is higher than a predetermined threshold value. Then the second wearable input device 2 transmits a command to the external device 110 through the radio transmitter unit 19 by the operation of the control unit 27.

Figure 10:
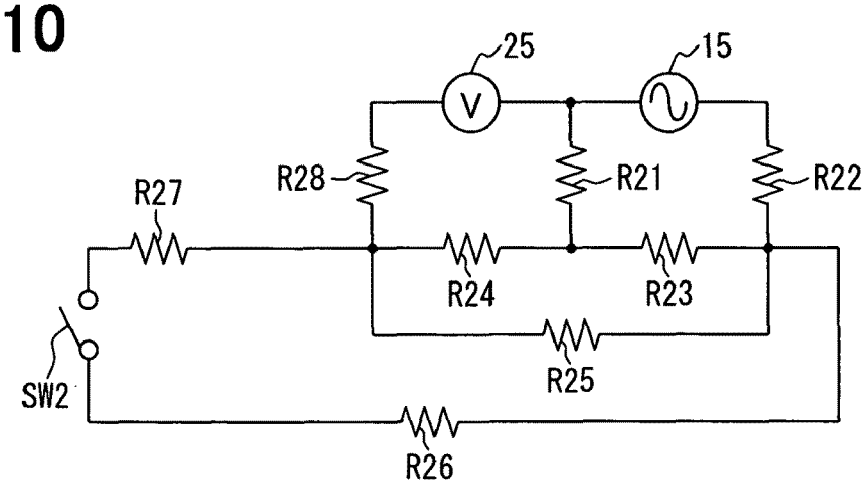
FIG. 10 is an equivalent circuit diagram of a measurement system of second the wearable input device.

FIG. 10 is an equivalent circuit diagram of the measurement system in the second wearable input device 2. In FIG. 10, resistance R21 represents the contact resistance between the signal electrode 11a and the finger. Resistance R22 represents the contact resistance between the signal electrode 11b and the finger. Resistance R28 represents the contact resistance between the measurement electrode 23 and the finger.

Resistance R23 represents the electrical resistance of the body site surface corresponding to the area X sandwiched between the signal electrodes 11a, 11b. Resistance R24 represents the electrical resistance of the body site surface corresponding to the area X' (FIG. 9B) sandwiched between the signal electrode 11a and the measurement electrode 23. Resistance R25 represents the electrical resistance of the path, through which a signal applied between the signal electrodes 11a, 11b flows through the body's interior and leaks out toward the measurement electrode 23.

It will be assumed that the second wearable input device 2 is worn on a forefinger and the forefinger and the thumb are brought into or out of contact with each other as exemplified in FIGS. 3A and 3B as in the first embodiment. In this case, resistance R26 represents the electrical resistance of the body site extended from the signal electrode 11b to the top end of the thumb by way of the base of the forefinger. Resistance R27 represents the electrical resistance of the body site extended from the top end of the forefinger to the body site where the measurement electrode 23 is worn. The the voltage measurement unit 25 may be a voltmeter.

As described above, the resistance R25 representing the electrical resistance of the current flow path, through which a signal applied between the signal electrodes 11a, 11b flows through the body's interior and leaks out toward the measurement electrode 23, is very large to any other body site, though this depends on the interval between the installed signal electrode 11a and measurement electrode 23. If the fingers are out of contact with each other (switch SW2 is off), therefore, the measured voltage value Voff measured at and outputted from the voltage measurement unit 25 is infinitely close to zero. If the fingers are in contact with each other (switch SW2 is on), meanwhile, the signal flows through the resistances R26, R27, which are sufficiently smaller than the resistance R25. Therefore, the measured voltage value Von measured by and outputted from the voltage measurement unit 25 is sufficiently higher than the measured voltage value Voff.

Therefore, it can be determined whether or not the fingers are in contact with each other by determining whether or not a measured voltage value inputted from the voltage measurement unit 25 is higher than a predetermined threshold value.

In this embodiment, an alternating current signal is applied from the signal supply unit 15 to the signal electrodes 11a, 11b as an example. Similarly to the first embodiment, however, a direct current signal may alternatively be applied from the signal supply unit 15.

In this embodiment, the signal electrodes 11a, 11b and the signal supply unit 15 correspond to a signal supply section, the voltage measurement unit 25 corresponds to a measuring section, and the control unit 27 corresponds to a detecting section.

Third Embodiment

Figure 11:
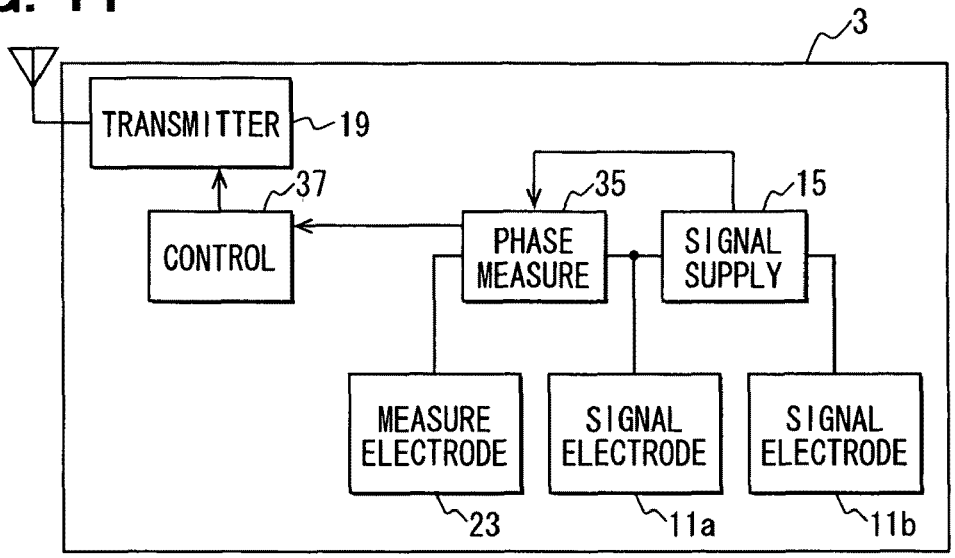
FIG. 11 is a block diagram showing a third wearable input device according to a third embodiment of the present invention.

A third wearable input device 3 is shown in FIG. 11 as a third embodiment. The third wearable input device 3 is provided with a phase measurement unit 35 in place of the voltage measurement unit 25 of the second wearable input device 2 of the second embodiment.

In the third wearable input device 3, the signal electrodes 11a, 11b and the measurement electrode 23 are arranged as in the second wearable input device 2 and provided in the finger ring body 10.

In the third wearable input device 3, the same processing as in the first and second embodiments is carried out. That is, the alternating current signal is applied between the signal electrodes 11a, 11b by the signal supply unit 15. The phase measurement unit 35 measures a phase delay based on the voltage (alternating current signal) produced between the signal electrode 11a and the measurement electrode 23. The phase delay is caused in the alternating current signal inputted from the measurement electrode 23 relative to the alternating current signal applied between the signal electrodes 11a, 11b. That is, the phase delay is a phase difference with values in the direction of delay taken as positive values.

The phase measurement unit 35 acquires the alternating current signal applied between the signal electrodes 11a, 11b from the signal supply unit 15 as a reference signal and measures phase delay relative to this reference signal. Then it inputs the resulting measured phase delay value to the control unit 37.

The control unit 37 carries out the following processing based on a measured phase delay value inputted from the phase measurement unit 35. When the measured phase delay value is higher than a predetermined threshold value, it determines that the fingers are in contact with each other. When the measured phase delay value is equal to or lower than the predetermined threshold value, it determines that the fingers are out of contact with each other.

The control unit 37 may be so configured as to carry out processing, in which the checking at S110 (or S210) in FIG. 7A or 7B is replaced with checking whether or not the measured phase delay value inputted from the phase measurement unit 35 is higher than the predetermined threshold value. Then the third wearable input device 3 transmits the command to the external device 110 through the radio transmitter unit 19 by the operation of the control unit 37.

Figure 12A:
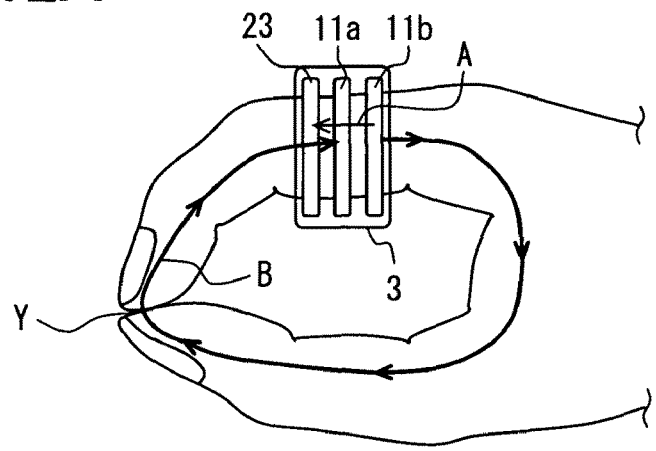
FIG. 12A is a schematic view showing principle of determination of whether fingers are in or out of contact with each other in the third wearable input device.
Figure 12B:
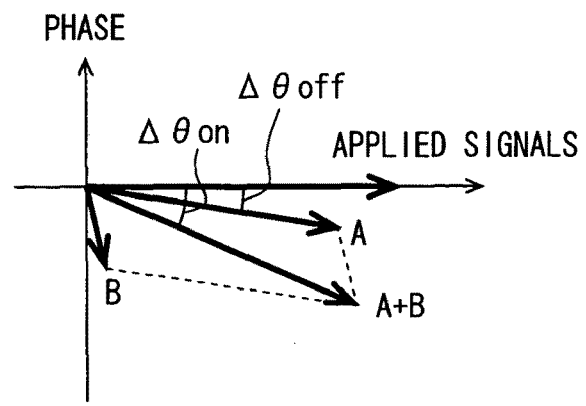
FIG. 12B is another schematic view showing principle of determination of whether fingers are in or out of contact with each other in the third wearable input device.

The principle of checking whether fingers are in or out of contact with each other in the third wearable input device 3 is described with reference to FIGS. 12A and 12B. As described in relation to the second embodiment and the like, part of the signal applied between the signal electrodes 11a, 11b is inputted to the measurement electrode 23 through the body's interior as shown by the signal A in FIG. 12B, even if fingers (for example, a forefinger and a thumb) are out of contact with each other. When the fingers are out of contact with each other, therefore, phase delay Δθoff is measured at the phase measurement unit 35 with respect to the signal A.

If the fingers are in contact with each other, meanwhile, the signal A is inputted to the measurement electrode 23. Further, the signal B flowing between the signal electrodes 11a, 11b in the opposite direction to signal A is inputted through the point of contact Y between the fingers. At this time, the phase delay of the signal B becomes longer than that of the signal A because its flow path is longer.

Therefore, if the fingers are in contact with each other, the phase delay Δθon of the synthesized signal of signal A and signal B measured by the phase measurement unit 35 is longer than the phase delay Δθoff measured when the fingers are out of contact with each other. That is, an inequality of Δθon>Δθoff holds.

Based on this phenomenon occurs, the control unit 37 carries out its processing. That is, if the measured phase delay value inputted from the phase measurement unit 35 is higher than the predetermined threshold value, it determines that the fingers are in contact with each other. When the measured phase delay value is equal to or lower than the predetermined threshold value, it determines that the fingers are out of contact with each other.

According to the third embodiment, the signal electrodes 11a, 11b and the signal supply unit 15 correspond to a signal supply section, the phase measurement unit 35 corresponds to a measuring section, and the control unit 37 corresponds to a detecting section.

Fourth Embodiment

Figure 13A:
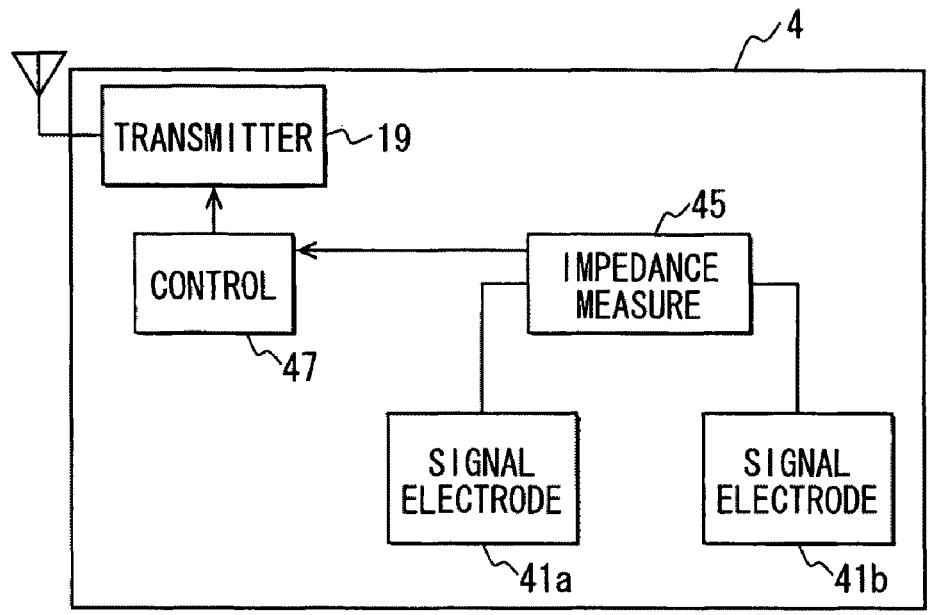
FIG. 13A is a block diagram showing a fourth wearable input device according to a fourth embodiment of the present invention.

A fourth wearable input device 4 is shown in FIG. 13A as a fourth embodiment.

The fourth wearable input device 4 includes ring-shaped signal electrodes 41a, 41b similar to the signal electrodes 11a, 11b and an impedance measurement unit 45 that measures impedance between the pair of ring-shaped signal electrodes 41a, 41b. The control unit 47 checks whether a finger is in or out of contact based on the measured impedance value (absolute value) inputted from the impedance measurement unit 45 and transmits a command corresponding to the result of check to the external device 110 through the radio transmitter unit 19.

In this fourth wearable input device 4, the impedance measurement unit 45 applies the alternating current signal between the ring-shaped signal electrodes 41a, 41b and measures a current arising therefrom to measure an impedance Z between the ring-shaped signal electrodes 41a, 41b.

Figure 13B:
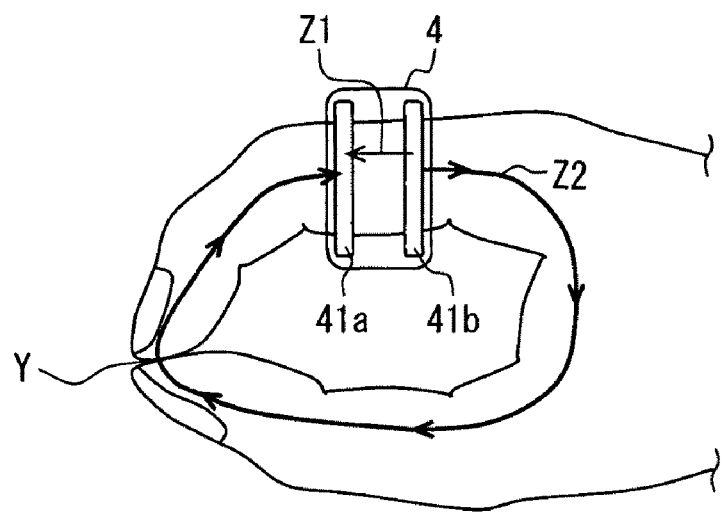
FIG. 13B is a schematic view showing principle of determination of whether fingers are in or out of contact with each other in the fourth wearable input device.

The impedance Zon measured by the impedance measurement unit 45 when the fingers are in contact is equal to the impedance Z1×Z2/(Z1+Z2) obtained when the following impedances are connected in parallel as shown in FIG. 13B. The impedance Z1 is formed in the path between the ring-shaped signal electrodes 41a, 41b, through which the supplied signal flows not by way of the point of contact Y between the fingers. The impedance Z2 is formed in the path between the ring-shaped signal electrodes 41a, 41b through which the supplied signal is propagated by way of the point of contact between the fingers (Zon=Z1×Z2/(Z1+Z2)). FIG. 13B explains the principle of determination of whether the fingers are in or out of contact with each other in the fourth wearable input device 4 in the fourth embodiment.

The impedance Zoff measured by the impedance measurement unit 45 when the fingers are out of contact is equal to the above impedance Z1 (Zoff=Z1).

Therefore, an inequality of Zoff>Zon holds between the following impedances Zoff and Zon. The impedance Zoff is measured by the impedance measurement unit 45 when the fingers are out of contact with each other. The impedance Zon is measured by the impedance measurement unit 45 when the fingers are in contact with each other.

For the above reason, the control unit 47 makes determination as follows. If the measured impedance value inputted from the impedance measurement unit 45 is higher than a predetermined threshold value, it determines that the fingers are out of contact with each other. If the measured impedance value is equal to or lower than the predetermined threshold value, it determines that the fingers are in contact with each other.

Specifically, the control unit 47 may be so configured as to carry out processing, in which the checking at S110 (or S210) in FIG. 7A or 7B is replaced with a check whether or not the measured impedance value inputted from the impedance measurement unit 45 is equal to or lower than the predetermined threshold value. The fourth wearable input device 4 transmits a command to an external device 110 through the radio transmitter unit 19 by the operation of the control unit 47.

In the fourth wearable input device 4 in the fourth embodiment, the ring-shaped signal electrodes 41a, 41b and the impedance measurement unit 45 correspond to an impedance measuring section, and the control unit 47 corresponds to a detecting section.

In this embodiment, the alternating-current voltage is applied between the ring-shaped signal electrodes 41a, 41b to measure impedance as an example. Instead, a direct-current voltage may be applied between the ring-shaped signal electrodes 41a, 41b to measure resistance R as the impedance Z.

If only the impedance between the ring-shaped signal electrodes 41a, 41b is simply measured, there is a possibility that the accuracy of determination is degraded. This is because the amount of change in impedance between a case when fingers are in contact with each other and a case when fingers are out of contact with each other is small. Therefore, the wearable input device 4 may be improved as exemplified in a fifth embodiment.

Fifth Embodiment

Figure 14:
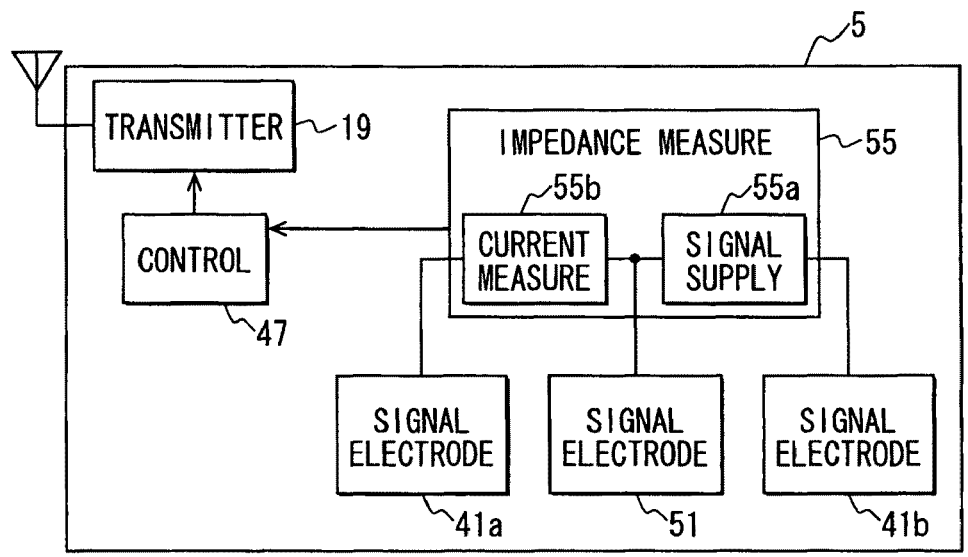
FIG. 14 is a block diagram showing a fifth wearable input device according to a fifth embodiment of the present invention.

A fifth wearable input device 5 is shown in FIG. 14 as the fifth embodiment.

The fifth wearable input device 5 is different from the fourth wearable input device 4 in respect of technique for measuring impedance Z.

The fifth wearable input device 5 includes another ring-shaped signal electrode 51 in addition to the ring-shaped signal electrodes 41a, 41b, and an impedance measurement unit 55. The ring-shaped signal electrode 51 is similar to the ring-shaped signal electrodes 41a, 41b and placed between the ring-shaped signal electrodes 41a, 41b. In the fifth wearable input device 5, the ring-shaped signal electrode 41a, ring-shaped signal electrode 51, and ring-shaped signal electrode 41b are arranged in parallel in this order at predetermined intervals along the axial line of a finger. These electrodes are housed in the finger ring body 10 so that their inner surfaces facing inward of the ring are exposed and brought into contact with a user's body.

Unlike the fourth wearable input device 4, the impedance measurement unit 55 includes a signal supply unit 55a and a current measuring unit 55b. The signal supply unit 55a supplies the alternating current signal between the ring-shaped signal electrodes 41b, 51, and the current measurement unit 55b measures a current inputted from the ring-shaped signal electrode 41a to measure the impedance between the ring-shaped signal electrodes 41a, 41b.

Between the ring-shaped signal electrode 41a and the ring-shaped signal electrode 51, there is provided a line having therein a small resistance for current measurement provided in the current measurement unit 55b. The ring-shaped signal electrode 41a and the ring-shaped signal electrode 51 are connected through this line so that they are at substantially the same potential. More specifically, the impedance measurement unit 55 approximately determines the impedance between the ring-shaped signal electrodes 41a, 41b by dividing the voltage V produced between the ring-shaped signal electrode 41b and the ring-shaped signal electrode 51 by the current I measured by the current measurement unit 55b. The impedance measurement unit 55 outputs the resulting measured impedance value Z to the control unit 47.

Figure 15:
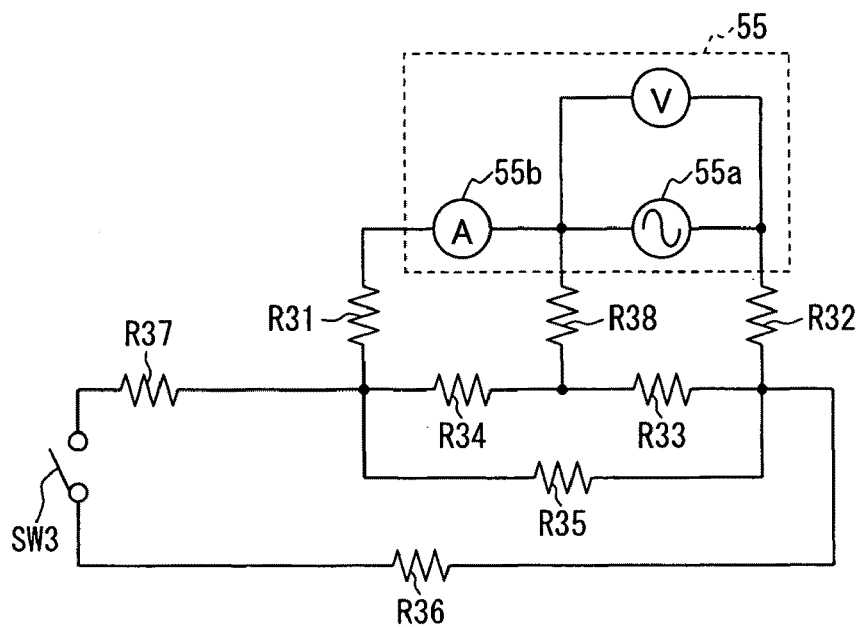
FIG. 15 is an equivalent circuit diagram of a measurement system of the fifth wearable input device.

The arrangement of the signal electrodes 41a, 41b, 51 relative to the finer is expressed as equivalent circuit shown in FIG. 15. Resistance R31 represents a contact resistance between the ring-shaped signal electrode 41a and the finger. Resistance R32 represents the contact resistance between the ring-shaped signal electrode 41b and the finger. Resistance R38 represents the contact resistance between the ring-shaped signal electrode 51 and the finger.

Resistance R33 represents the electrical resistance of the body site surface corresponding the area sandwiched between the ring-shaped signal electrodes 51, 41b. Resistance R34 represents the electrical resistance of the body site surface corresponding to the area sandwiched between the ring-shaped signal electrodes 41a, 51. Resistance R35 represents the electrical resistance of the path through which a signal applied between the ring-shaped signal electrodes 51, 41b flows through the body's interior and leaks out toward the ring-shaped signal electrode 41a.

The fifth wearable input device 5 is worn on a forefinger and the forefinger and a thumb are brought into or out of contact with each other (FIGS. 3A and 3B). In this case, resistance R36 represents the electrical resistance of the body site extended from the ring-shaped signal electrode 41b to the top end of the thumb by way of the base of the forefinger. Resistance R37 represents the electrical resistance of the body site extended from the top end of the forefinger to the body site where the ring-shaped signal electrode 41a is worn.

The resistance R35 is large. If the fingers are out of contact with each other (switch SW3 is off), the amount of the current, which leaks out toward the ring-shaped signal electrode 41a through the body's interior when the signal is applied between the ring-shaped signal electrodes 51, 41b, is small. The impedance Zoff (absolute value) measured by the impedance measurement unit 55 takes a very large value.

Therefore, the difference between the impedances Zoff and Zon is very large. The impedance Zoff is measured by the impedance measurement unit 55 when the fingers are out of contact with each other. The impedance Zon is measured by the impedance measurement unit 55 when the fingers are in contact with each other. As a result, it can be accurately determined whether the fingers are in or out of contact with each other as compared with the fourth wearable input device 4 in the fourth embodiment.

The control unit 47 provided in the fifth wearable input device 5 in the fifth embodiment carries out the same processing as in the fourth embodiment based on the measured impedance value inputted from the impedance measurement unit 55 that measures the impedance as described above. The radio transmitter unit 19 wirelessly outputs a command inputted from the control unit 47 to the external device 110.

In the fifth wearable input device 5, the application unit 55a and the ring-shaped signal electrodes 41b, 51 correspond to a signal supply section. The current measurement unit 55b, the ring-shaped signal electrode 41a and the line connecting the ring-shaped signal electrodes 41a, 51 together correspond to a current measuring section. The control unit 47 corresponds to a detecting section.

In the fifth embodiment, the alternating current signal is applied between the ring-shaped signal electrodes 41b, 51 through the current supply unit 55a. Instead, the current supply unit 55a may be so configured as to supply a direct current signal in place of the alternating current signal.

Sixth Embodiment

Figure 16A:
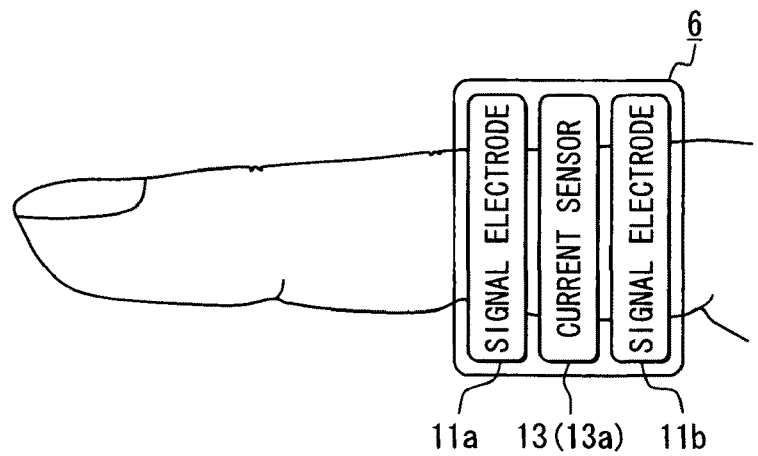
FIG. 16A is a schematic view showing a sixth wearable input device according to a sixth embodiment of the present invention.
Figure 16B:
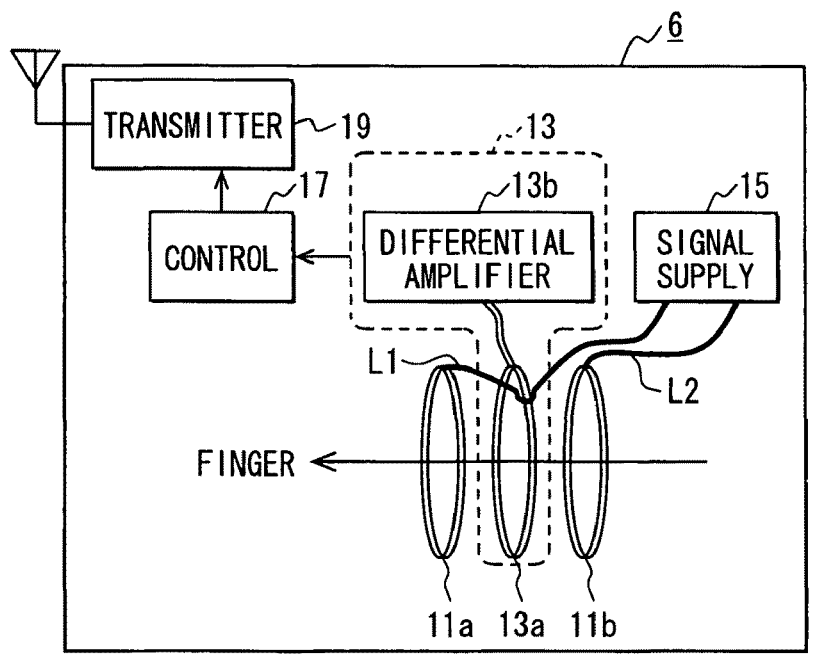
FIG. 16B is another schematic view showing the sixth wearable input device.

A sixth wearable input device 6 is shown in FIGS. 16A and 16B as a sixth embodiment. In the sixth wearable input device 6, the order of arrangement of the signal electrodes 11a, 11b and the current sensor 13 in the first wearable input device 1 is changed. Therefore, a change from the first wearable input device 1 in the first embodiment will be hereafter described.

As shown in FIG. 16A, the sixth wearable input device 6 is configured so that the signal electrodes 11a, 11b and the current sensor 13 are arranged in parallel in the finger ring body 10 along the axial line of the finger ring body 10. However, the current sensor 13 (the current transformer 13a) is provided between the signal electrodes 11a, 11b in the finger ring body 10.

More specifically, the sixth wearable input device 6 is so configured that the current transformer 13a is provided in the second flow path of first and second flow paths. The first flow path is equivalent to the following body sites: a body site extended from the area of the forefinger where the signal electrode 11b is brought into contact therewith to the top end of the thumb by way of the base of the forefinger and the base of the thumb; and a body site extended from the top end of the forefinger brought into contact with the top end of the thumb to the area where it is brought into contact with the signal electrode 11a. This flow path is equivalent to the path, through which a supplied signal flow when two fingers are in contact with each other. The second flow path is equivalent to the finger body site sandwiched between the signal electrodes 11a, 11b not through the point of contact between the two fingers. This flow path is equivalent to the path through which a supplied signal is propagated regardless of whether the fingers are in or out of contact with each other.

However, it cannot be detected whether fingers are in or out of contact with each other only by changing the installation position of the current transformer 13a from the first flow path adopted in the first embodiment to the second flow path.

In the sixth wearable input device 6, for this reason, one of the lines L1 and L2 shown in FIGS. 17A to 18B is provided so that it runs inside the ring of the current transformer 13a (FIG. 5). The line L1 connects the signal supply unit 15 and the signal electrode 11a together. The line L2 connects the signal supply unit 15 and the signal electrode 11b together. In these examples, the line L1 is provided so that it runs inside the ring of the current transformer 13a.

In this embodiment, the lines L1, L2 are disposed as described above. The current transformer 13a is thereby provided as in the first embodiment so that it can be checked whether the fingers are in or out of contact with each other. Specifically the current transformer 13a is provided at a position where it is not interlinked with a first closed circuit and is interlinked with a second closed circuit. The first closed circuit is a circuit through which the supplied signal flows even when the fingers are not in contact with each other. The second closed circuit is a circuit through which the supplied signal flows only when the fingers are in contact with each other.

The first closed circuit refers to the closed circuit C1 (indicated by broken line in FIGS. 17A and 18A) connecting the signal supply unit 15, line L2, signal electrode 11b, second flow path, signal electrode 11a and line L1. The second closed circuit is denoted as C2 (indicated by alternate long and short dash line in FIG. 18A) connecting the signal supply unit 15, line L2, signal electrode 11b, first flow path, signal electrode 11a, and line L1.

Figure 17A:
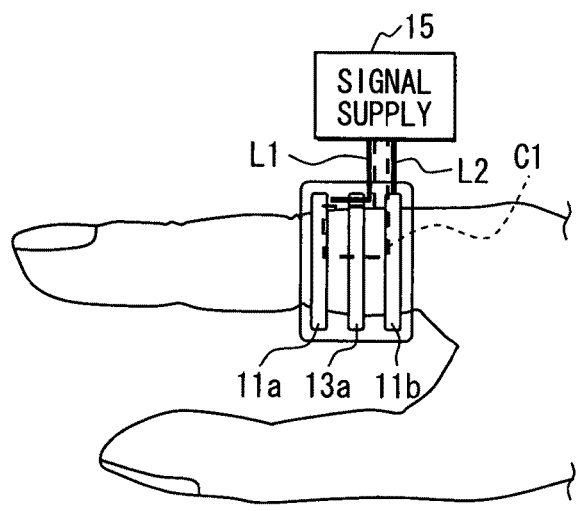
FIGS. 17A and 17B are schematic views showing a manner in which a supplied signal is propagated when fingers are out of contact with each other in the sixth embodiment.
Figure 17B:
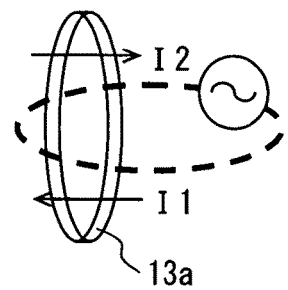
Figure 18A:
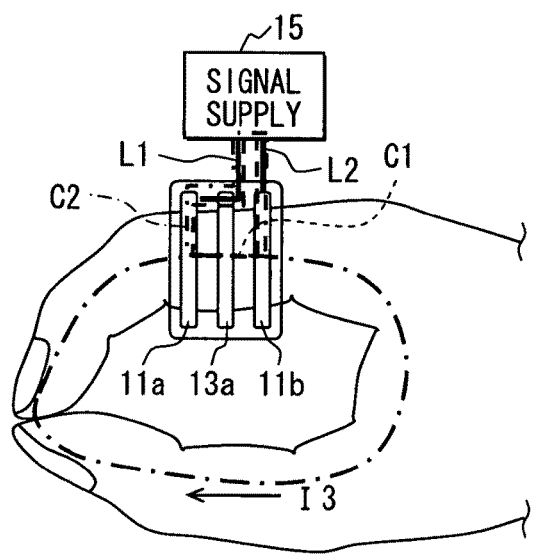
FIGS. 18A and 18B are schematic views showing a manner in which a supplied signal is propagated when fingers are in contact with each other in the sixth embodiment.
Figure 18B:
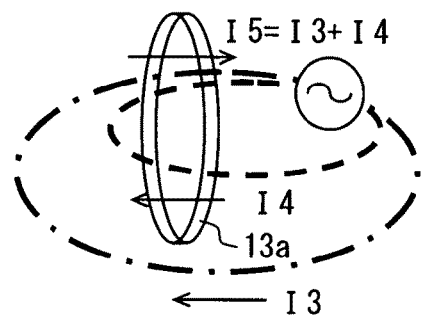

In the sixth wearable input device 6, even if the two fingers are out of contact with each other, the supplied signal from the signal supply unit 15 flows inside the current transformer 13a through the second flow bath and the line L1 (FIG. 17). The current I1 flowing from the signal electrode 11b toward the current transformer 13a and the current I2 flowing from the signal electrode 11a to the signal supply unit 15 through the line L1 are basically equal to each other in amount (I1=I2). Further, these currents flow opposite directions.

In the current transformer 13a, therefore, the magnetic field produced by the current I1 in the second flow path and the magnetic field produced by the current I2 in the line L1 are canceled out by each other. Then substantially no magnetic flux is captured in the core 103 (FIG. 5) of the current transformer 13a.

As a result, though the supplied signal flows inside the current transformer 13a, if the two fingers are out of contact with each other, the measured current value obtained from the current sensor 13 is substantially zeroed as in the first embodiment.

In the sixth wearable input device 6, meanwhile, the following supplied signals are produced when the two fingers are in contact with each other. The supplied signal flowing from the signal electrode 11b to the signal electrode 11a through the first flow path; and a supplied signal flowing from the signal electrode 11b to the signal electrode 11a through the second flow path. That is, letting the current flowing from the signal electrode 11b to the first flow path side be I3 and the current of the supplied signal flowing from the signal electrode 11b to the second flow path side, the following takes place: the current of the supplied signal flowing inside the current transformer 13a and propagated to the signal electrode 11a is I4; however, the current I5 of the supplied signal flowing from the signal electrode 11a to the signal supply unit 15 through the line L1 running inside the current transformer 13a is expressed as I5=I3+I4.

Therefore, magnetic flux corresponding to the current I3 of the supplied signal flowing through the first flow path is captured in the core 130 of the current transformer 13a and the current I3 is measured at the current sensor 13.

According to the sixth wearable input device 6, as a result, it can be accurately determined whether the fingers are in or out of contact with each other by checking whether the fingers are in or out of contact with each other based on the measured current value inputted from the current sensor 13 and the predetermined threshold value. Therefore, the sixth wearable input device 6 can carry out the functions equivalent to those of the first wearable input device 1.

The core 130 of the current transformer 13a in this embodiment corresponds to an annular body for capturing magnetic flux. This correspondence is the same with the first embodiment.

According to the first to sixth wearable input devices 1 to 6 in the first to sixth embodiments, the external device 110 can be operated by a simple body movement as bringing fingers into or out of contact with each other. This makes it easy for a user to operate the external device 110. It is unnecessary to operate a small tact switch or the like. This is advantageous in that, even when a user operates the first to sixth wearable input device 1 to 6 for a long time, the user rarely becomes tired.

According to the above embodiments, in which fingers are in or out of contact with each other is detected, a user's action of holding or releasing something can be detected and this can provide users with an input interface delivering novel maneuvering feeling.

The invention is not limited to the first to sixth embodiments but may be variously embodied. For example, the command to be transmitted to the external device 110 may be changed depending on whether fingers are in or out of contact with each other. The measurement values (voltage, current, phase delay, and impedance) in the above embodiments may also be varied by pressing force from fingers when the fingers are in contact with each other. Therefore, the control unit 17, 27, 37, 47 may be so configured as to change a command to be transmitted to the external device 110 according to pressing force from the fingers.

FIGS. 19A and 19B illustrate the correspondence between contact pressure P provided when fingers are in contact with each other and measurement values of various physical parameters such as current I, voltage V, phase delay Δθ and impedance Z. When the current I is measured as in the first embodiment, for example, the current I measured by the current sensor 13 is increased with an increase in the contact pressure P provided when the fingers are in contact with each other. When the voltage V is measured as in the second embodiment, similarly, the voltage V measured by the voltage measurement unit 25 is increased with an increase in the contact pressure P provided when the fingers are in contact with each other.

When phase delay Δθ is measured as in the third embodiment, the phase delay Δθ measured by the phase measurement unit 35 is increased with an increase in the contact pressure P provided when the fingers are in contact with each other. When impedance is measured as in the fourth or fifth embodiment, the impedance Z measured by the impedance measurement unit 45, 55 is decreased with increase in the contact pressure P provided when the fingers are in contact with each other.

The measurement values in the above embodiments are also varied by the positional relation between the contact position of fingers and the first wearable input devices 1 to 6. Therefore, the control unit 17, 27, 37, 47 may be so configured as to change a command to be transmitted to the external device 110 by checking, based on a measurement value, whether a user slides his/her finger far away from or near to the first wearable input device 1 to 6.

FIGS. 20A and 20B illustrate the correspondence between the slide direction and measurement value. When the current I is measured as in the first embodiment, for example, it is expected that the current I measured by the current sensor 13 will be decreased as the contact position Y is shifted far away from the device. When the voltage V is measured as in the second embodiment, similarly, it is expected that the voltage V measured by the voltage measurement unit 25 will be decreased as the contact position Y is shifted far away from the device. When the phase delay Δθ is measured as in the third embodiment, it is expected that phase delay Δθ will be increased as the contact position Y is shifted far away from the device. When impedance Z is measured as in the fourth and fifth embodiments, it is expected that the impedance Z measured by the impedance measurement unit 45, 55 will be increased as the contact position Y is shifted far away from the device.

The input interface for operating the external device 110 may be configured with a combination of wearable input devices 1 to 6.

The individual wearable input devices 1 to 6 having the input interface are so configured as to respectively transmit different commands to the external device 110. These wearable input devices 1 to 6 having the input interface are worn on multiple fingers of a user. Thus a large number of commands can be transmitted to the external device 110 by simple action of bringing fingers into or out of contact with each other.

The first wearable input device 1 need not be configured as a single device and can be configured as devices divided by function. In the first wearable input device 1, the signal electrodes 11a, 11b and the signal supply unit 15 are electrically independent of the other constituent elements. Therefore, the first wearable input device 1 may be divided into a first device including the signal electrodes 11a, 11b and the signal supply unit 15 and a second device including the other constituent elements.

In this case, multiple first devices can be prepared for the second device so that alternating current signals different in frequency are applied from the first devices between the signal electrodes 11a, 11b. The second device can be provided with a section for separating alternating current signals provided through the current transformer 13a on a frequency-by-frequency basis. Thus multiple actions of bringing fingers into or out of contact can be detected by the second device and as a result, a larger number of commands can be transmitted to the external device 110.

If the second device is worn on a thumb and the first device is worn on a forefinger and a middle finger, for example, a large number of commands can be transmitted to the external device 110 by the action of bringing the forefinger and the thumb into or out of contact with each other and the action of bringing the middle finger and the thumb into or out of contact with each other.

The electrodes of the wearable input devices 1 to 6 in the first to sixth embodiments need not be a ring-shaped signal electrode. They may be constructed as an electrode in an open circular shape whose circle is partly cut off or an electrode in any other shape. To stabilize the operation of the first wearable input device 1 to 6, it is desirable that the electrodes and body sites should be in contact with each other in a sufficient area. For this purpose, it is desirable to adopt electrodes having a large surface area for these electrodes. It is also advisable that such a structure that pressure is applied from outside an electrode should be adopted to bring the electrode and a body surface into tight contact with each other.

In the above embodiments, commands are wirelessly outputted from the first wearable input device 1 to 6 to the external device 110. Instead, the first to sixth wearable input device 1 to 6 may be so configured as to wiredly output commands to an external device 110.

Seventh Embodiment

Figure 21A:
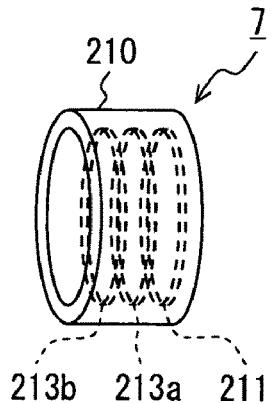
FIG. 21A is a perspective view of a seventh wearable input device according to a seventh embodiment of the present invention.
Figure 21B:
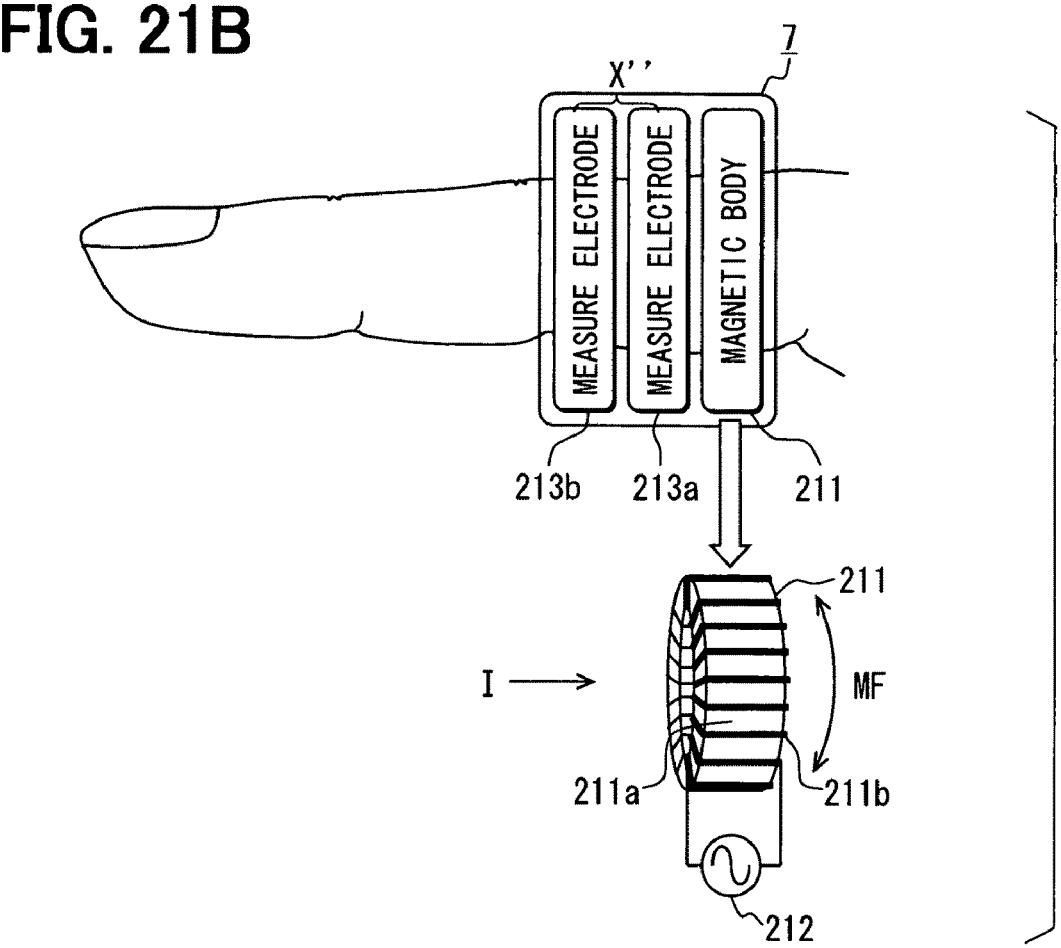
FIG. 21B is a schematic view showing arrangement of a coil, electrodes, and the like of the seventh wearable input device.

A seventh wearable input device is shown in FIGS. 21A and 21B as the seventh embodiment. This seventh wearable input device 7 is worn on a user's finger. The seventh wearable input device 7 is so configured that, when the top end of the finger with the seventh wearable input device 7 worn thereon is brought into or out of contact with another body site of the same user, it is detected (FIG. 22A) and a command based on the result of this detection is inputted to an external device 2110 (FIG. 23).

The seventh wearable input device 7 includes a magnetic field generating body (magnetic body) 211, which is shown in FIG. 21B and comprised of an annular core 211a, a coil 211b wound around the annular core 211a, and a pair of measurement electrodes 213a, 213b, each of which is an annular electrode. The magnetic body 211 and the measurement electrodes 213a, 213b are provided in a finger ring body 210 as an annular body forming the outside shape of the seventh wearable input device 7 so that they are isolated from and integrated with the finger ring body 210.

Specifically, the magnetic body 211 and the measurement electrodes 213a, 213b are provided in the finger ring body 210 so that they are arranged in parallel at predetermined intervals along the axial line of a finger on which the wearable input device 7 is worn.

The magnetic body 211 is provided in the finger ring body 210 so that it is positioned in an area external to the area X sandwiched between the measurement electrodes 213a, 213b. The measurement electrodes 213a, 213b are fixed in the finger ring body 210 so that, when the seventh wearable input device 7 is worn on a finger, the inner surfaces of the measurement electrodes 213a, 213b facing inward of the ring are exposed from the finger ring body 210 to be brought into contact with the user's body surface (finger surface).

In the example in FIG. 21B, the measurement electrodes 213a, 213b are placed between the magnetic body 211 and the top end of the finger. Instead, the measurement electrodes 213a, 213b may be placed between the magnetic body 211 and the base of the finger. Than is, when the seventh wearable input device 7 is worn on a finger and used, the seventh wearable input device 7 can be worn in either orientation.

In this seventh wearable input device 7, the coil 211b of the magnetic body 211 generates a current when an alternating current (AC) voltage is applied from a signal supply unit 212 to between both ends of the coil 211b. The magnetic body 211 thereby forms a magnetic field MF varying in the direction of the circumference of the annular core 211a. That is, the seventh wearable input device 7 detects that a finger with the seventh wearable input device 7 worn thereon is brought into or out of any other body site by measuring an electrical signal I produced in the direction of the axis of the finger with the seventh wearable input device 7 worn thereon, orthogonal to the direction of the circumference of the annular core 211a, due to electromagnetic induction arising from the above varying magnetic field.

Figure 22A:
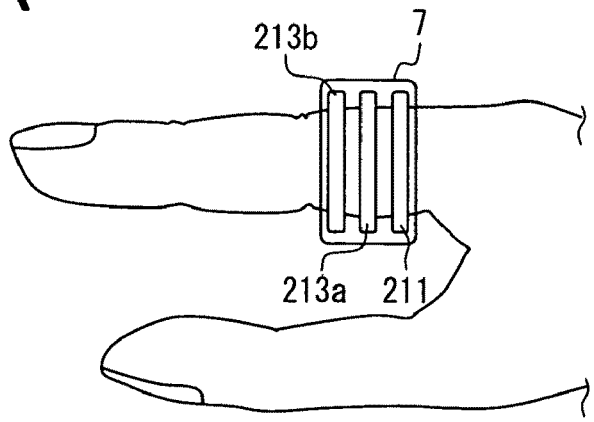
FIG. 22A is a schematic view showing principle of the operation of the seventh wearable input device.
Figure 22B:
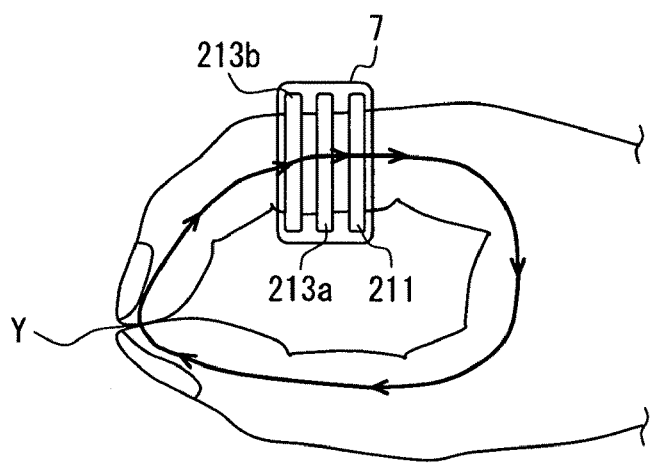
FIG. 22B is a schematic view showing the principle of operation of the seventh wearable input device.
Figure 23:
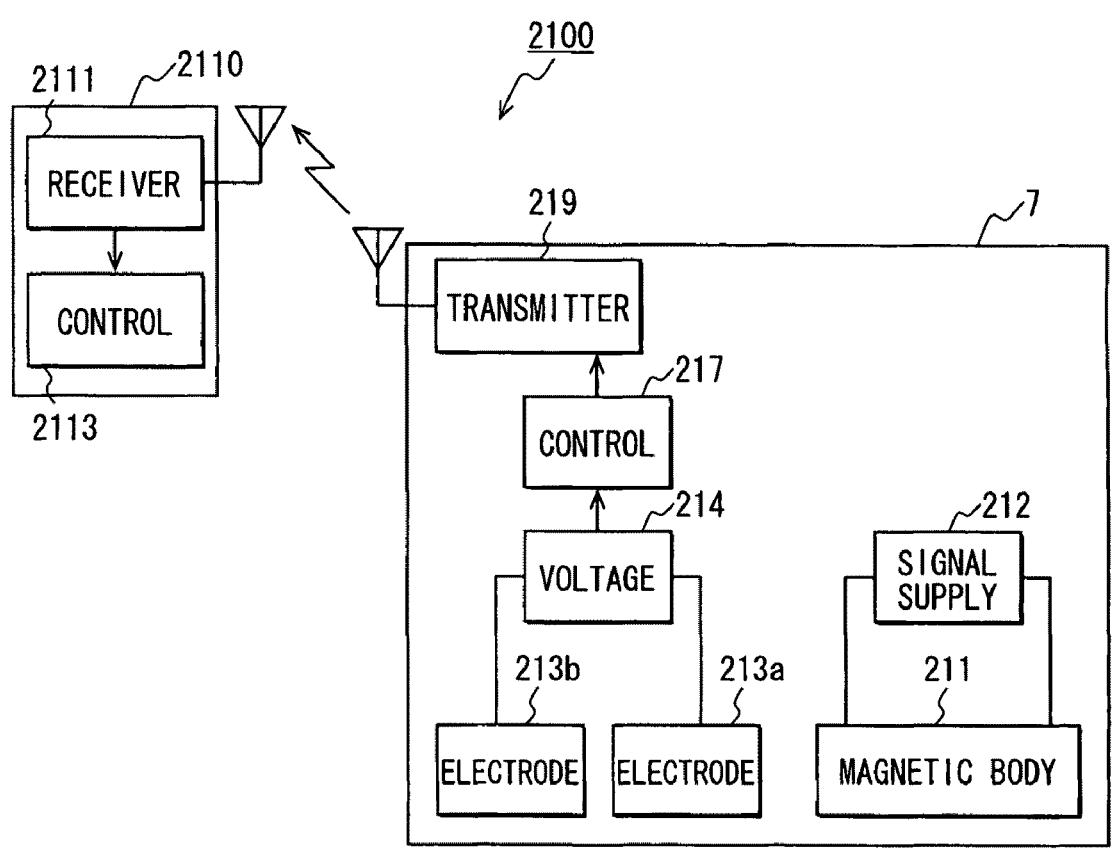
FIG. 23 is a block diagram showing in detail the seventh wearable input device and a remote operation system.

FIGS. 22A and 22B illustrate the principle of determination of whether fingers are in or out of contact with each other in the seventh wearable input device 7. It is assumed for the sake of simplicity of description that the seventh wearable input device 7 is worn on a forefinger and the forefinger and the thumb are brought into or out of contact with each other by the user's body movement as shown in FIGS. 22A and 22B.

When the forefinger and the thumb are out of contact with each other as shown in FIG. 22A, a closed annular conductor path running in the direction of the axis of the seventh wearable input device 7 (finger ring body 210) is not formed in the user's body. The top end side of the finger with the seventh wearable input device 7 worn thereon is isolated. Therefore, even when a varying magnetic field is produced in the magnetic body 211, an electrical signal (current I) arising from electromagnetic induction is not produced in the finger with the seventh wearable input device 7 worn thereon.

Therefore, an electrical signal is not produced in the body site (site corresponding to the area X") sandwiched between the measurement electrodes 213a, 213b and the measured voltage value obtained between the measurement electrodes 213a, 213b is zeroed.

When the forefinger and the thumb are in contact with each other as shown in FIG. 22B, meanwhile, a closed annular conductor path is formed by the thumb, the forefinger, and the body site connecting the thumb and the forefinger at the base of the thumb and the forefinger.

For this reason, an electrical signal due to electromagnetic induction is produced in the finger with the seventh wearable input device 7 worn thereon due to the varying magnetic field of the magnetic body 211. This electrical signal is specifically a current I flowing in the direction of the axis of the finger orthogonal to the direction of the circumference of the annular core 211a. As a result, a voltage larger than zero is measured between the measurement electrodes 213a, 213b.

This phenomenon is utilized to detect that fingers are brought into or out of contact with each other by the user's body movement based on a measured voltage value obtained between the measurement electrodes 213a, 213b.

Figure 22C:
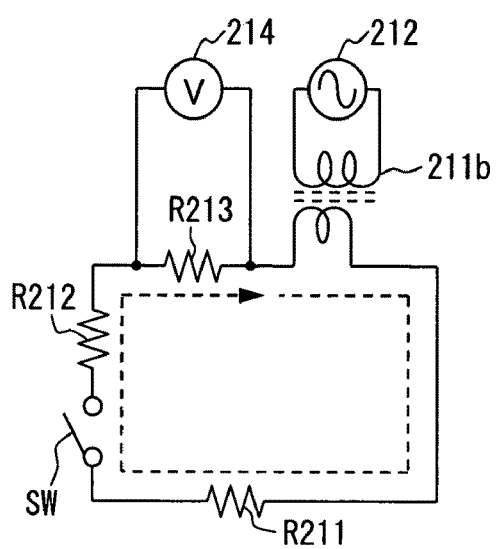
FIG. 22C is an equivalent circuit diagram of a measurement system of the seventh wearable input device.

FIG. 22C is an equivalent circuit diagram of a measurement system in the seventh wearable input device 7. In FIG. 22C, however, resistance of the user's body site through which an electrical signal produced in the user's body by electromagnetic induction is propagated is expressed by a lumped parameter system for the sake of simplicity of explanation.

Resistance R211 indicated in FIG. 22C represents the electrical resistance of the body site extended from the measurement electrode 213a to the top end of the thumb. Resistance R212 represents the electrical resistance of the body site extended from the top end of the forefinger to the measurement electrode 213b. Resistance R213 represents the electrical resistance between the measurement electrodes 213a, 213b. Switch SW represents the forefinger and the thumb in or out of contact with each other.

As indicated in FIG. 22C, inductance exists in the user's body. Therefore, when the forefinger and the thumb are out of contact with each other as in FIG. 22A, the passage of an electrical signal through the user's body due to electromagnetic induction does not occur. When the forefinger and the thumb are in contact with each other as in FIG. 22B, a closed circuit is formed and an electrical signal is passed through the user's body by electromagnetic induction. In this embodiment, voltage produced between the measurement electrodes 213a, 213b due to this phenomenon is measured by a voltage measurement unit 214 to detect that the fingers are brought into or out of contact with each other by the user's body movement.

In this example it is assumed that the top end of a forefinger with the seventh wearable input device 7 worn thereon is brought into or out of a thumb. The top end of the forefinger with the seventh wearable input device 7 worn thereon need not be brought into contact with the thumb and it may be brought into contact with other body parts such as a middle finger, the palm of the other hand, or the trunk of the body. That is, the user can utilize the seventh wearable input device 7 in this embodiment by carrying out that a body site on the end side (finger tip side) of the body site, where the seventh wearable input device 7 is worn, is brought into or out of contact with any other body site.

Even when such a body movement is carried out, a closed conductor path is formed in the user's body and an electrical signal is passed by electromagnetic induction. Therefore, it is possible to detect that two body sites are in or out of contact with each other through voltage measurement at the voltage measurement unit 214.

The seventh wearable input device 7 is used in a remote operation system 2100 as shown in FIG. 23.

The seventh wearable input device 7 further includes a control unit 217 and a radio transmitter unit 219 in addition to the magnetic body 211, the signal supply unit 212 that applies an alternating current signal (alternating current voltage) to this magnetic body 211, the measurement electrodes 213a, 213b and the voltage measurement unit 214 that measures the voltage between the measurement electrodes 213a, 213b, The signal supply unit 212 is driven by a constant voltage or a constant current and applies an alternating current signal (alternating current voltage) to both ends of the coil 211b of the magnetic body 211. The supplied signal may be a triangular wave signal, a sine wave signal, a rectangular wave signal, a sawtooth wave signal or the like.

The voltage measurement unit 214 measures the voltage between the measurement electrodes 213a, 213b and inputs the resulting measured voltage value (effective value) to the control unit 217.

The control unit 217 checks whether the fingers are in or out of contact with each other based on a measured voltage value inputted from the voltage measurement unit 214. Then the control unit inputs a command based on the result of this determination as an actuating signal for the external device 2110 through the radio transmitter unit 219. The radio transmitter unit 219 wirelessly transmits the above command to the external device 2110 under the control of the control unit 217.

Figure 24A:
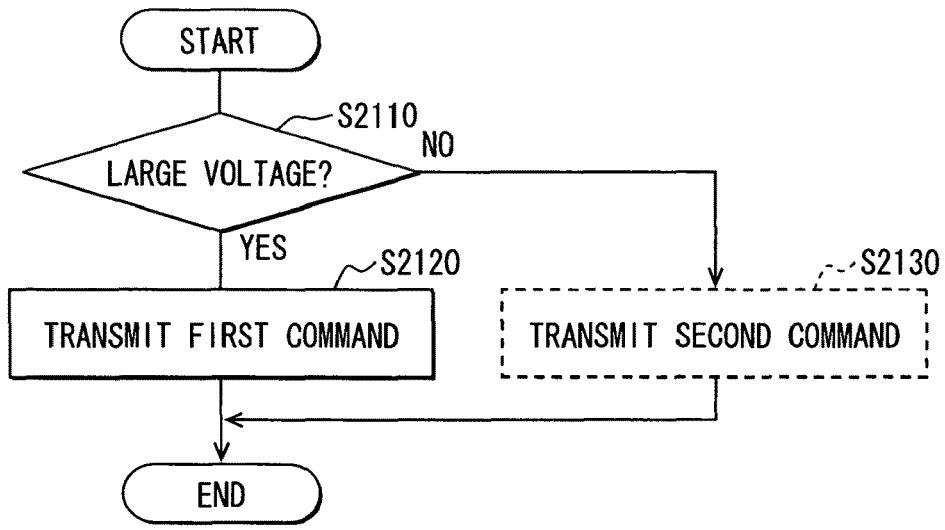
FIG. 24A is a flowchart showing processing carried out by a control unit of the seventh wearable input device.

Specifically, the control unit 217 repeatedly carries out the processing shown in FIG. 24A and thereby inputs (transmits) a command based on the result of the above determination to the external device 2110 through the radio transmitter unit 219.

Specifically, in the control unit 217, it is checked first whether or not a measured voltage value inputted from the voltage measurement unit 214 is large, that is, whether the measured voltage is higher than a predetermined threshold value (S2110). When it is determined that the measured voltage value is large (Yes at S2110), it is determined that the fingers are in contact with each other. Then a first command supposed to be transmitted to the external device 2110 when the fingers are in contact with each other is transmitted to the external device 2110 through the radio transmitter unit 219 (S2120). When it is determined that the measured voltage value inputted from the voltage measurement unit 214 is equal to or lower than the above predetermined threshold value (No at S2110), it is determined that the fingers are out of contact with each other. Then a second command supposed to be transmitted to the external device 2110 when the fingers are out of contact with each other is transmitted to the external device 2110 through the radio transmitter unit 219 (S2130). The control unit 217 may be so configured that the processing of 2130 is not carried out.

The external device 2110 in the remote operation system 2100 in this embodiment includes, as shown in FIG. 23, a radio receiver unit 2111 and a control unit 2113. This external device 2110 receives the above commands wirelessly transmitted from the seventh wearable input device 7 through the radio receiver unit 2111 and carries out processing corresponding to the commands by the control unit 2113. For example, the external device 2110 may output a picture signal representing that something is grabbed or released in a virtual space through a display screen (not shown) based on a command received from the seventh wearable input device 7.

The remote operation system 2100 in this embodiment carries out processing corresponding to the movement of the fingers of the user wearing the seventh wearable input device 7 by the external device 2110 by the above processing procedure. Remote operation of the external device 2110 by the user is thereby implemented.

Figure 24B:
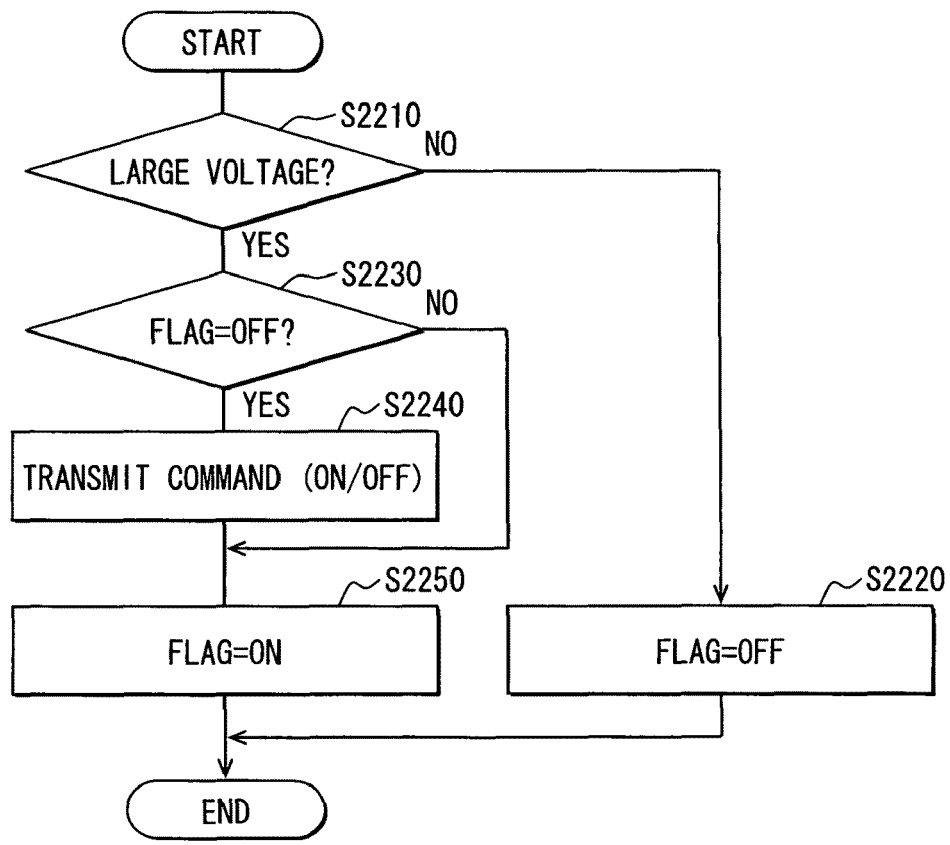
FIG. 24B is another flowchart showing processing carried out by the control unit of the seventh wearable input device.

The control unit 217 may alternatively be so configured as to periodically and repeatedly carry out the processing shown in FIG. 24B, for example.

Specifically, in the control unit 217, it is checked at S2110 whether or not a measured voltage value inputted from the voltage measurement unit 214 is large, that is, the measured voltage is higher than a predetermined threshold value (S2210). When the measured voltage value is equal to or lower than the predetermined threshold value (No at S2210), a status flag indicating whether fingers are in or out of contact with each other is set to off (S2220). This indicates. that the fingers are out of contact with each other. When it is determined that the measured voltage value is higher than the predetermined threshold value (Yes at S2210), it is checked whether or not the status flag is set to off (S2230). It is thereby checked whether or not the fingers have been just brought into contact with each other. When the status flag is set to off (Yes at S2230), a predetermined command to turn on/off the external device 2110 is outputted through the radio transmitter unit 219 to remotely operate the external device 2110 (S2240). Then the setting of the status flag is changed to on to indicate that the fingers are in contact with each other (S2250). When the status flag is set to on (No at S2230), the command is not transmitted and the status flag is kept on.

With the control unit 217 configured as described above, the power supply to the external device 2110 can be turned on/off just by, for example, bringing a forefinger and a thumb into contact with each other.

The control unit 217 may be so configured that the time period, for which a measured voltage value is higher than the predetermined threshold value, is measured to measure the time of contact between fingers, and commands to be inputted to the external device 2110 are changed according to the contact time of fingers. Alternatively, the control unit 217 may be so configured that a pattern, in which fingers are brought into or out of contact with each other, is recorded, and a command corresponding to the inputted pattern is outputted to the external device 2110. Various algorithms can be used for the algorithm for determining a command to be inputted to the external device 2110 based on the measured voltage value inputted from the voltage measurement unit 214.

Figure 25A:
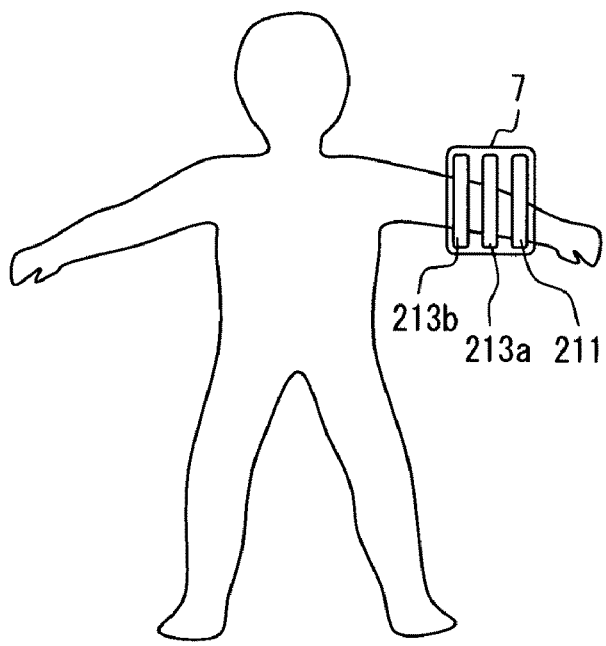
FIG. 25A is a schematic view showing an example, in which the seventh wearable input device is used as an armlet.
Figure 25B:
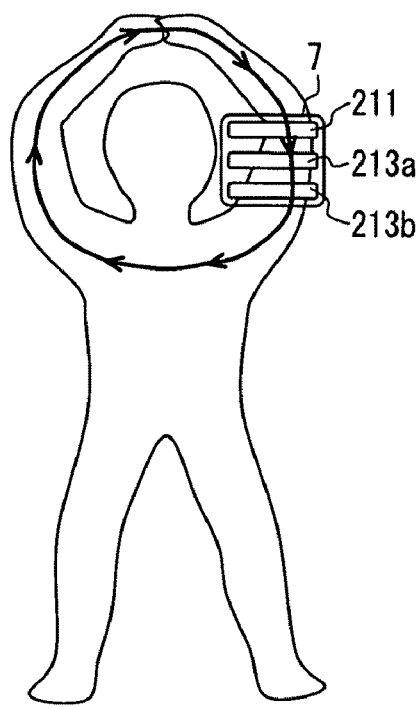
FIG. 25B is a schematic view showing the example, in which the seventh wearable input device is used as an armlet.

In this embodiment, the seventh wearable input device 7 is formed in a finger ring shape so that it can be worn on a finger. However, the seventh wearable input device 7 may be increased in size and formed in an armlet shape so that it can be worn on an arm. In this case, the external device 2110 can be remotely operated by, for example, the action of brining both hands into or out of contact with each other as shown in FIGS. 25A and 25B.

In the seventh wearable input device, the magnetic body 211 and the signal supply unit 212 correspond to a signal supply section. The measurement electrodes 213a, 213b and the voltage measurement unit 214 correspond to a measuring section.

The processing of 2110 or S2210 carried out by the control unit 217 corresponds to a detecting section. The processing of S2120, S2130, S2240, and the like carried out by the control unit 217 corresponds to an actuating signal outputting section.

Eighth Embodiment

Figure 26A:
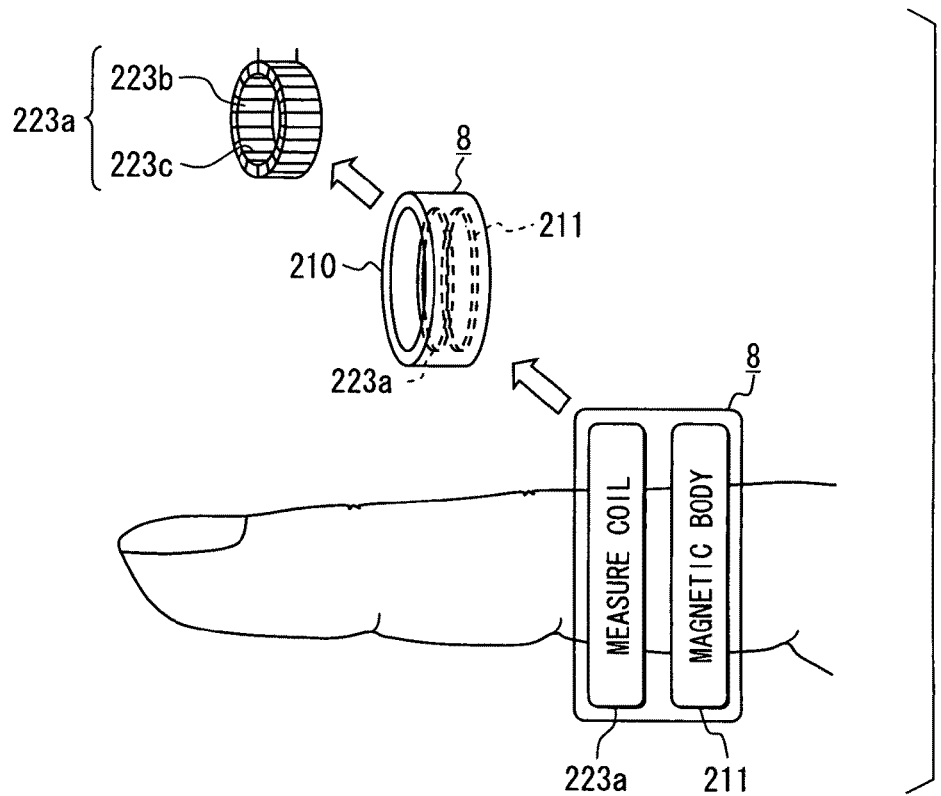
FIG. 26A is a schematic view showing an eighth wearable input device according to an eighth embodiment of the present invention.
Figure 26B:
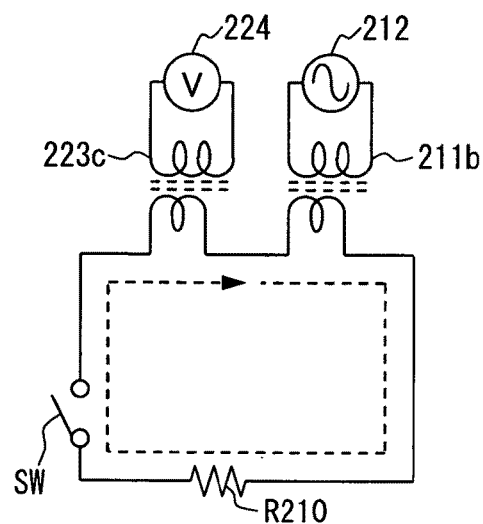
FIG. 26B is an equivalent circuit diagram of a measurement system of the eighth wearable input device.

An eighth wearable input device 8 is shown in FIGS. 26A and 26B as the eighth embodiment. The eighth wearable input device 8 is basically identical with the seventh, wearable input device 7, in which the voltage measurement is carried out by the measurement electrodes 213a, 213b and the voltage measurement unit 214. However, the eighth wearable input device 8 includes a configuration for carrying out current measurement in place of voltage measurement. With respect to the eighth wearable input device 8, therefore, the same constituent elements as in the seventh embodiment will be marked with the same reference numerals as in the seventh embodiment and the description thereof will be omitted as appropriate.

As shown in FIG. 26A, the eighth wearable input device 8 includes the magnetic body 211 and a measurement coil 223a comprised of an annular body formed by winding a coil 223c around an annular core 223b. The magnetic body 211 and the measurement coil 223a are provided in the finger ring body 210 as an annular body forming the outside shape of the eighth wearable input device 8 so that they are isolated from the finger ring body 210 and integrated with the finger ring body 210.

The magnetic body 211 and the measurement coil 223a are arranged in parallel at predetermined intervals along the axial line of the finger ring body 210, that is, along the axial line of a finger on which the wearable input device 8 is worn.

In this eighth wearable input device 8, it is detected that fingers are brought into or out of contact with each other by a user's body movement. Specifically, an electrical signal (current) in a finger with the eighth wearable input device 8 worn thereon is produced due to electromagnetic induction arising from a varying magnetic field produced by the magnetic body 211 and measuring, and this electrical signal is measured by the measurement coil 223a utilizing the same principle of electromagnetic induction.

FIG. 26B is an equivalent circuit diagram of the measurement system in the eighth wearable input device 8. Resistance R210 shown in FIG. 26B represents the electrical resistance of a conductor path formed in the user's body when a finger with the eighth wearable input device 8 worn thereon is brought into contact with any other body site. Switch SW represents the finger with the eighth wearable input device 8 worn thereon and another body site in or out of contact with each other.

When the finger with the eighth wearable input device 8 worn thereon and the other body site are out of contact with each other and the top end of the finger with the eighth wearable input device 8 worn thereon is isolated, the passage of an electrical signal through the user's body by electromagnetic induction is not caused (switch SW in FIG. 26B is turned off) even by a varying magnetic field produced by the magnetic body 211. When the finger with the eighth wearable input device 8 worn thereon and the other body site are in contact with each other, a closed conductor path is formed in the user's body (switch SW in FIG. 26B is turned on) and an electrical signal is passed through the user's body by electromagnetic induction.

Therefore, when the finger with the eighth wearable input device 8 worn thereon is in contact with any other body site, a current is produced in the direction orthogonal to the direction of the circumference of the measurement coil 223a (annular core 223b). A magnetic field is produced in the direction of the circumference of the measurement coil 223a and a voltage having a magnitude corresponding to the amount of current of an electrical signal passed through the user's body is produced across the coil 223c.

Utilizing this principle, the voltage across the coil 233c is measured and the current flowing through the user's body is thereby measured. It is thereby detected that the fingers are brought into or out of contact with each other by the user's body movement.

Figure 27A:
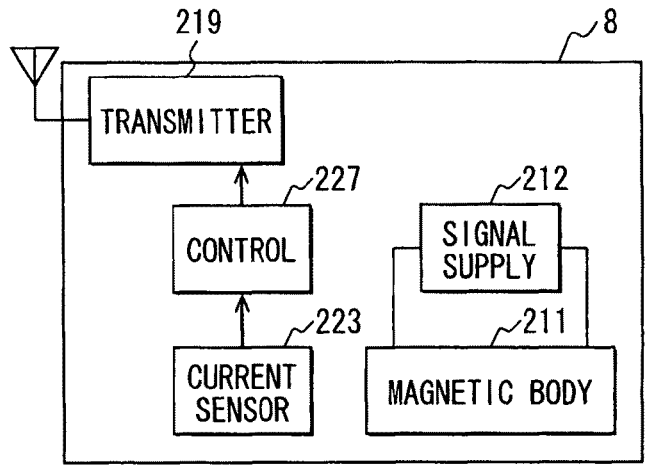
FIG. 27A is a block diagram showing in detail one example the eighth wearable input device.

As shown in FIG. 27A, this eighth wearable input device 8 includes, in addition to the magnetic body 211 and the signal supply unit 212, a current sensor 223, a control unit 227 and a radio transmitter unit 219. The current sensor 223 is comprised of the measurement coil 223a and a measuring circuit 224. As in the seventh embodiment, an alternating current signal (alternating current voltage) is applied between both ends of the coil 211b of the magnetic body 211. In this case, a current passed through the user's body (a current in the direction orthogonal to the direction of the circumference of the measurement coil 223a) is measured with the current sensor 223 using the above technique. Then the resulting measured current value (effective value) is inputted to the control unit 227.

The control unit 227 makes the following determination based on the measured current value (effective value) inputted from the current sensor 223. When the measured current value is higher than a predetermined threshold value, it determines that the fingers are in contact with each other. When the measured voltage value is equal to or lower than the predetermined threshold value, it determines that the fingers are out of contact with each other.

Specifically, the control unit 227 carries out the processing, in which the check 2110 (or S2210) in FIG. 24A (or 24B) is replaced with "checking whether or not the measured current value inputted from the current sensor 223 is higher than the predetermined threshold value." The control unit 227 thereby checks whether the fingers are in or out of contact with each other.

According to the result of this determination, the control unit 227 transmits a command to the external device 2110 through the radio transmitter unit 219.

Figure 27B:
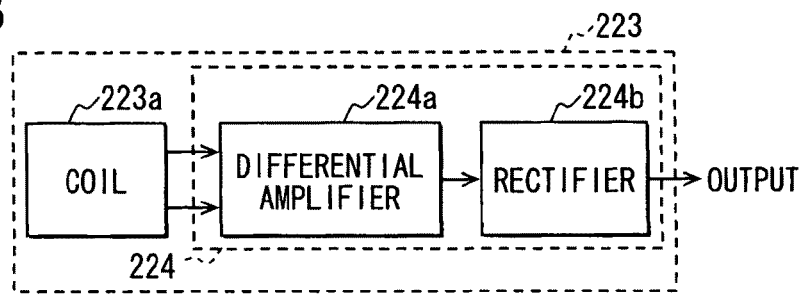
FIG. 27B is a block diagram showing one example of a current sensor in the eighth wearable input device.

The current sensor 223 may be configured as shown in FIG. 27B. It is provided with a differential amplifier 224a and a rectifier 224b. The differential amplifier circuit 224a is connected across the coil 223c including the measurement coil 223a, amplifies the difference between signals inputted from both ends of the coil 223c and outputs the resulting amplified signal. The rectifier 224b rectifies the output signal (alternating current signal) of the differential amplifier circuit 224a and converts it into a direct current signal. Thus the measuring circuit 224 outputs an output signal from the rectifier 224b as the measured current value.

With the measuring circuit 224 configured as described above, the effective value of voltage produced across the coil 223c is converted into the measured current value (effective value) of a current flowing in the direction of the axis of the body site where the measurement coil 223a is worn. It is outputted from the current sensor 223.

Figure 27C:
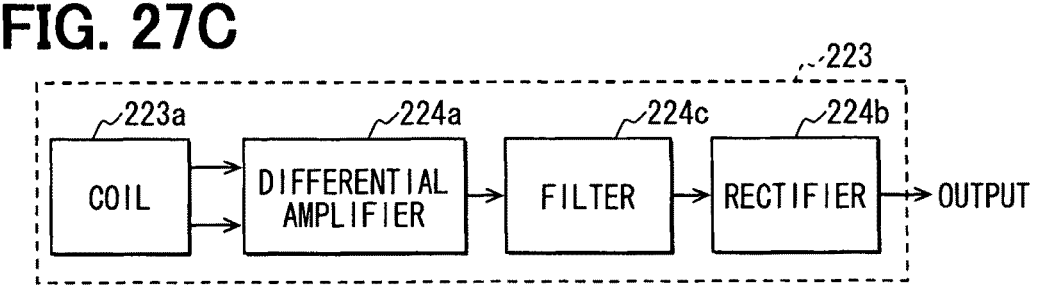
FIG. 27C is a block diagram showing in detail another example of the current sensor in the eighth wearable input device.

In the current sensor 223 in this embodiment, the difference between signals inputted from both ends of the coil 223c is differentially amplified. Therefore, common mode noise inputted from both ends of the coil 223c can be cut. However, it is more desirable to take the measure shown in FIG. 27C. That is, it is more desirable that a filter 224c that passes only signals of the same frequency as that of signals applied to the magnetic body 211 should be provided between the differential amplifier circuit 224a and the rectifier 224b. Thus the current sensor 223 can remove noise that cannot be removed even by the differential amplifier circuit 224a.

Figure 27D:
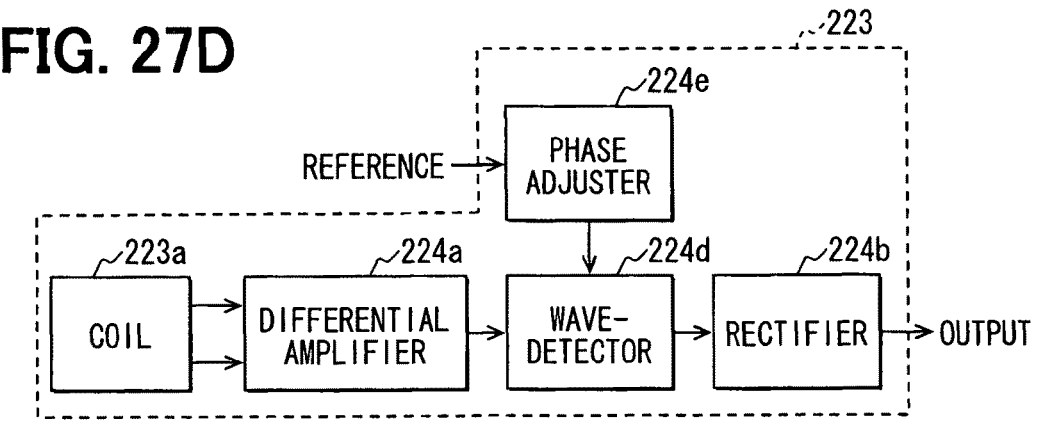
FIG. 27D is a block diagram showing in detail a further example of the current sensor in the eighth wearable input device.

The measuring circuit 224 may be configured as shown in FIG. 27D. Between the differential amplifier circuit 224a and the rectifier 224b with a synchronous detector 224d is provided. Synchronous detection is carried out by the synchronous detector 224d using a signal applied to the magnetic body 211 as a reference signal. The output signal of the synchronous detector 224d is inputted to the rectifier 224b and the measured current value is outputted. With the measuring circuit 224 configured as described above, even when the output frequency of a supplied signal changes, it can be dynamically coped with to remove a noise signal. It is advisable that the phase of the reference signal should be regulated by a phase adjuster 224e as required.

In the eighth wearable input device 8 the magnetic body 211 and the signal supply unit 212 correspond to a signal supply section. The current sensor 223 corresponds to a measuring section. The measurement coil 223a corresponds to a measuring body. The control unit 227 corresponds to a detecting section and an actuating signal outputting section.

Ninth Embodiment

Figure 28A:
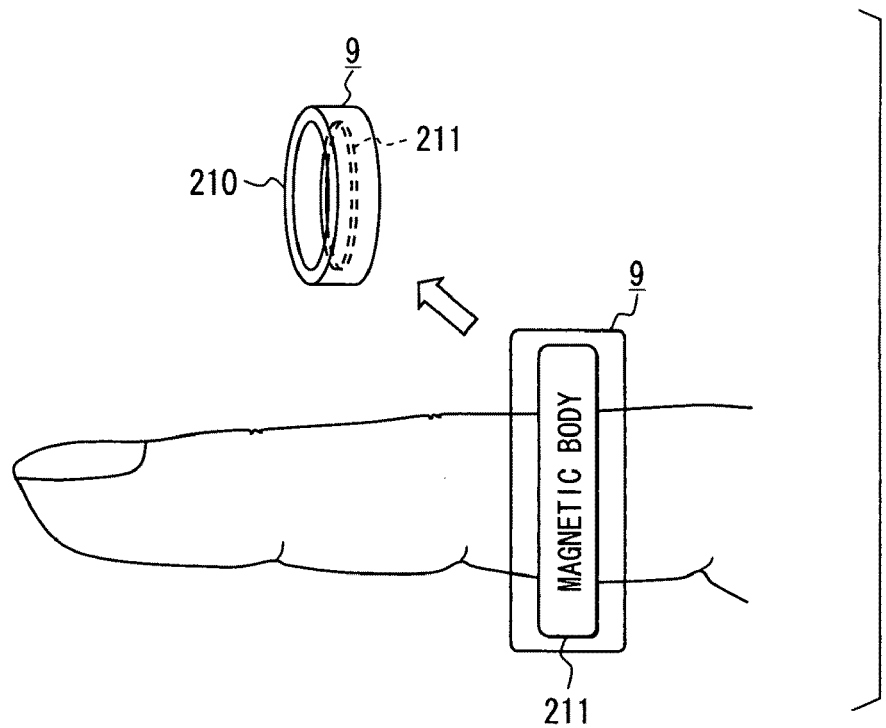
FIG. 28A is a schematic view showing a ninth wearable input device according to a ninth embodiment of the present invention.

A ninth wearable input device 9 is shown in FIG. 28A as the ninth embodiment. The ninth wearable input device 9 is different from those in the seventh and eighth embodiments in that the impedance Z of the coil 211b of the magnetic body 211 is used for measuring the physical parameter quantity of an electrical signal passed through a user's body.

As shown in FIG. 28A, the ninth wearable input device 9 is not provided with the measurement electrodes 213a, 213b or the current sensor 223 for measuring the physical parameter quantity of an electrical signal passed through a user's body. Instead, only the magnetic body 211 is provided in a finger ring body 210 as an annular body forming the outside shape of the ninth wearable input device 9 so that the signal supply unit is isolated from and integrated with the finger ring body 210.

Figure 28B:
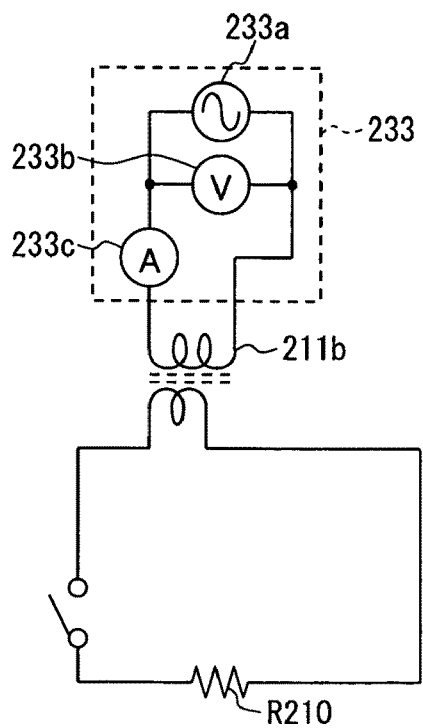
FIG. 28B is an equivalent circuit diagram of a measurement system of the ninth wearable input device.

FIG. 28B is an equivalent circuit diagram of the measurement system in the ninth wearable input device 9. Resistance R210 represents electrical resistance of a conductor path formed in the user's body when a finger with the ninth wearable input device 9 worn thereon and any other body site are in contact with each other. Switch SW represents the finger with the ninth wearable input device 9 worn thereon and the other body site in or out of contact with each other.

When the ninth wearable input device 9 is worn on a user's finger any other body site are out of contact with each other and the top end of the finger with the ninth wearable input device 9 worn thereon is isolated, the passage of an electrical current through the user's body by electromagnetic induction is not caused even by a varying magnetic field produced by the magnetic body 211.

Meanwhile, when the finger with the ninth wearable input device 9 worn thereon and the other body site are in contact with each other, a closed conductor path is formed in the user's body and an electrical signal is passed through the user's body by electromagnetic induction. Therefore, the impedance of the coil 211b is varied.

Using this principle, the ninth wearable input device 9 measures the impedance of the coil 211b by an impedance measurement unit 233 and thereby detects whether the fingers are in or out of contact with each other by the user's body movement.

Figure 29:
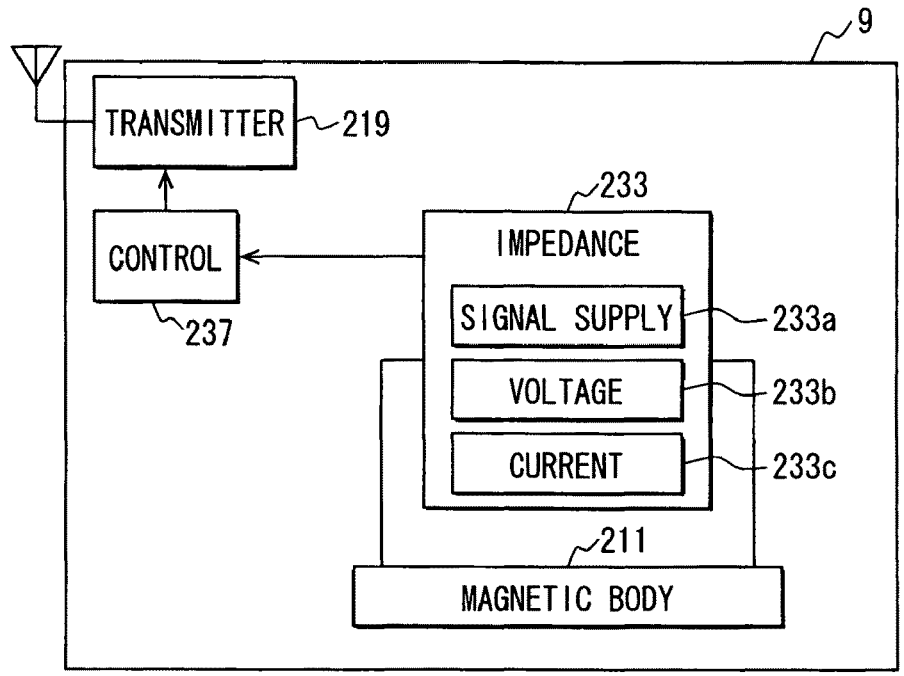
FIG. 29 is a block diagram showing in detail the ninth wearable input device.

As shown in FIG. 29, the ninth wearable input device 9 further includes a control unit 237 that determines whether the fingers are in or out of contact with each other based on the measured impedance value (absolute value) inputted from the impedance measurement unit 233 and transmits a command based on the result of this determination through a radio transmitter unit 219, in addition to the magnetic body 211, the impedance measurement unit 233 that measures the impedance of the coil 211b comprising the magnetic body 211, and the radio transmitter unit 219 that wirelessly transmits the command to an external device 2110 under the control of the control unit 237.

The impedance measurement unit 233 includes a signal supply unit 233a that is driven by a constant voltage or a constant current and applies an alternating current signal (alternating current voltage) to both ends of the coil 211b of the magnetic body 211, a voltage measurement unit 233b that measures the voltage across the coil 211b, and a current measurement unit 233c that measures the current passed through the coil 211b. The impedance measurement unit 233 measures the impedance Z of the coil 211b from the end-to-end voltage V measured by the voltage measurement unit 233b and the current I measured by the current measurement unit 233c. Then it inputs the resulting measured impedance value (absolute value) to the control unit 237.

With respect to the absolute value |Z| of the impedance Z of the coil 211b, the relation expressed as |Zoff|>|Zon| holds between these two impedances, that is, between the absolute value |Zoff| of the impedance Zoff obtained when the fingers are out of contact with each other and the absolute value |Zon| of the impedance Zon obtained when the fingers are in contact with each other. Therefore, the control unit 237 checks whether the fingers are in or out of contact with each other according to this relation.

Specifically, the control unit 237 carries out the processing, in which the determination 2110 (or S2210) in FIG. 24A (or 24B) is replaced with checking whether the measured impedance value (absolute value) inputted from the impedance measurement unit 233 is higher than a predetermined threshold value. It thereby determines whether the fingers are in or out of contact with each other.

When the measured impedance value (absolute value) inputted from the impedance measurement unit 233 is equal to or lower than the predetermined threshold value, it is determined that the fingers are in contact with each other and an affirmative determination is made at 2110 or S2210. When the measured impedance value (absolute value) is higher than the predetermined threshold value, it is determined that the fingers are out of contact with each other and a negative determination is made at 2110 or S2210.

According to the result of this determination, the control unit 237 outputs a command to the external device 2110 through the radio transmitter unit 219.

If the internal impedance is disregarded, the voltage across the voltage measurement unit 233b agrees with the voltage across the signal supply unit 233a. Therefore, when the signal supply unit 233a is driven by the constant voltage, the voltage measurement unit 233b is not provided and the impedance measurement unit 233 is provided with only the signal supply unit 233a and the current measurement unit 233c. Thus the ninth wearable input device 9 determines the impedance of the coil 211b from the voltage V applied to the coil 211b by the signal supply unit 233a and the current I measured by the current measurement unit 233c.

When the signal supply unit 233a is driven by the constant current, the current (amplitude) measured by the current measurement unit 233c takes a constant value. In this case, the current measurement unit 233c is not provided and the impedance measurement unit 233 is provided with only the signal supply unit 233a and the voltage measurement unit 233b. Thus the ninth wearable input device 9 determines the impedance of the coil 211b based on voltage.

In this embodiment, the absolute value of the impedance of the coil 211b is measured at the impedance measurement unit 233. Instead, the impedance measurement unit 233 may be so configured as to measure the real part of the impedance (that is, resistance) of the coil 211b.

Also in this case, the measured impedance value is lower when the fingers are in contact with each other than when the fingers are out of contact with each other. Therefore, it can be determined whether the fingers are in or out of contact with each other by the above-described principle.

In the ninth wearable input device 9, the magnetic body 211 and the signal supply unit 233a correspond to a signal supply section. The impedance measurement unit 233 corresponds to an impedance measuring section. The control unit 237 corresponds to a detecting section and an actuating signal outputting section.

Tenth Embodiment

Figure 30:
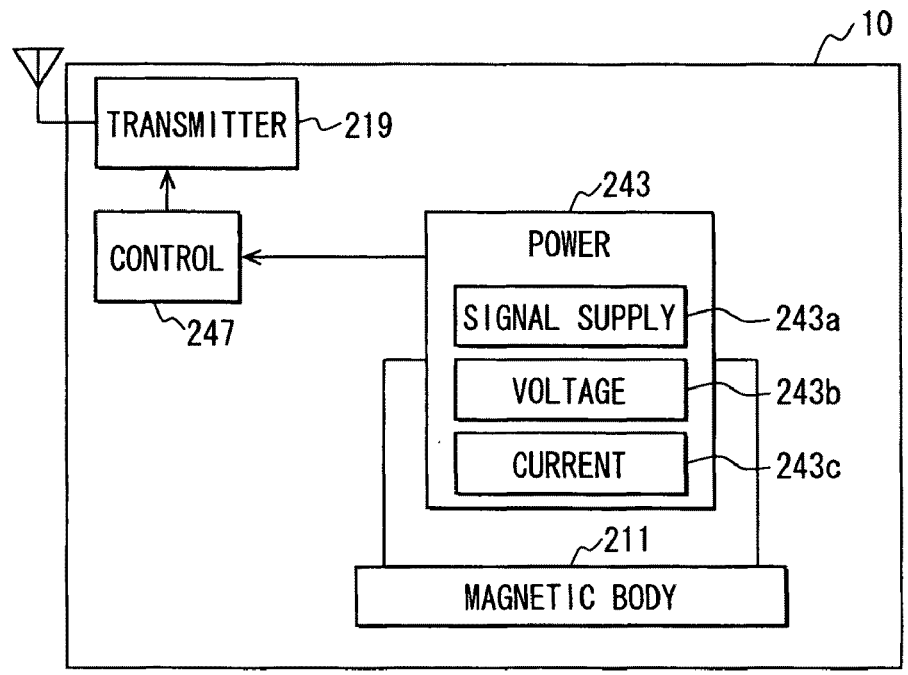
FIG. 30 is a block diagram showing in detail a tenth wearable input device according to a tenth embodiment of the present invention.

A tenth wearable input device 10 is shown in FIG. 30 as the tenth embodiment. The tenth wearable input device 10 is configured to measuring power consumed by the coil 211b of the magnetic body 211, not the electrical signal passed through the user's body. This tenth wearable input device 10 is basically identical with the ninth wearable input device 9 in the ninth embodiment, except that a power measurement unit 243 is provided in place of the impedance measurement unit 233.

With respect to the configuration of the tenth wearable input device 10, therefore, a difference from the ninth wearable input device 9 will be described.

The tenth wearable input device 10 is simply configured as that in the ninth embodiment. That is, the magnetic body 211 is provided in the finger ring body 210 as an annular body forming the outside shape of the tenth wearable input device 10 so that it is isolated from and integrated with the finger ring body 210 (FIG. 28A).

As shown in FIG. 30, this tenth wearable input device 10 includes, in addition to the magnetic body 211, a power measurement unit 243 that measures the average power consumption of the coil 211b of the magnetic body 211, a control unit 247 that determines whether the fingers are in or out of contact with each other based on the measurement value of average power consumption inputted from the power measurement unit 243 and transmits a command based on the result of this determination through the radio transmitter unit 219, and the radio transmitter unit 219 that wirelessly transmits this command to the external device 2110 under the control of the control unit 247.

Like the impedance measurement unit 233, the power measurement unit 243 includes a signal supply unit 243a that is driven by a constant voltage and applies the alternating current signal (alternating current voltage) to both ends of the coil 211b of the magnetic body 211, a voltage measurement unit 243b that measures the voltage across the coil 211b and a current measurement unit 243c that measures the current passed through the coil 211b. The power measurement unit 243 measures the average power consumption (effective power or apparent power) of the coil 211b from the end-to-end voltage V measured by the voltage measurement unit 243b and the current I measured by the current measurement unit 243c. Then it inputs the measurement value of average power consumption to the control unit 247.

The equivalent circuit diagram of the measurement system in this tenth wearable input device 10 is the same as the equivalent circuit diagram (FIG. 28B) of the ninth wearable input device 9. The tenth wearable input device 10 and the ninth wearable input device 9 are different in that whether impedance is measured or average power consumption is measured from the voltage across the coil 211b and the measurement value of current passed through the coil 211b.

The control unit 247 is inputted with the measurement value of average power consumption from the thus configured power measurement unit 243. The control unit carries out the following processing: processing in which the determination 2110 (or S2210) in FIG. 24A (or 24B) is replaced with the check of determining whether or not a measurement value of average power consumption inputted from the power measurement unit 243 is higher than a predetermined threshold value. It thereby determines whether the fingers are in or out of contact with each other.

On the assumption that the application unit 243a is driven by the constant voltage or the constant current, the relation expressed as Won>Woff holds with respect to the average power consumption of the coil 211b. In this expression, Woff denotes average power consumption obtained when the fingers are out of contact with each other, and Won denotes average power consumption obtained when the fingers are in contact with each other. This relation is utilized to determine whether the fingers are in or out of contact with each other as described above.

According to the result of this determination, the control unit 247 transmits a command to the external device 2110 through the radio transmitter unit 219.

As in the ninth embodiment, in the tenth wearable input device 10 when the internal impedance is disregarded, the voltage across the voltage measurement unit 243b agrees with the voltage across the application unit 243a.

Therefore, when the current supply unit 243a is constant voltage power measurement unit 243 is provided with only the application unit 243a and the current measurement unit 243c. Thus the tenth wearable input device 10 determines the average power consumption of the coil 211b from the voltage V applied to the coil 211b by the application unit 243a and the current I measured by the current measurement unit 243c. Also when the application unit 243a is driven by the constant current, the same measure as in the ninth embodiment may be taken.

In the tenth wearable input device 10 the magnetic body 211 and the application unit 243a correspond to a signal supply section. The power measurement unit 243 corresponds to a power measuring section. The control unit 247 corresponds to a detecting section and an actuating signal outputting section.

According to the seventh to tenth wearable input device 7 to 10 in the above embodiments, an external device 2110 can be operated by so simple body movement as bringing fingers into or out of contact with each other. This makes it easy for a user to operate the external device 2110. It is unnecessary to operate a small tact switch or the like. This brings the advantage that even though a user operates the seventh to tenth wearable input device 7 to 10 for a long time, he/she is less prone to get more and more tired.

A state, in which fingers are in or out of contact with each other, can be detected. According to the above embodiments, therefore, a user's action of holding or releasing something can be detected and this can provide users with an input interface delivering novel maneuvering feeling.

In the above wearable input devices 7 to 10, a technique for applying an electrical signal through electrodes in contact with a user's body is not adopted as the signal supply section. Instead, an electrical signal may be applied to a user's body by electromagnetic induction is adopted. Therefore, whether fingers are in or out of contact with each other can be more accurately detected than with the technique for applying a signal through electrodes.

When a signal is applied through electrodes, the contact resistance is varied depending on the manner in which the electrodes and the skin are in contact with each other. As a result, the amount of an electrical signal (amount of current) inputted to the user's body is varied. For this reason, if the electrodes are not appropriately in contact with the skin, the contact of a finger cannot be accurately detected. When a signal is applied through electrodes, the following measure is taken: the signal is applied between a pair of electrodes and whether a finger is in or out of contact is detected utilizing the phenomenon that the flow of an electrical signal is varied depending on whether the finger is in or out of contact. Therefore, even when the finger is out of contact, a signal is applied to the user's body. For this reason, it is required to reduce the amount of an electrical signal (amount of current) applied with the influence on the user's body taken into account.

Meanwhile, in the above embodiments in which an electrical signal is applied to the user's body by electromagnetic induction, the following advantage is brought: an electrical signal is not applied to the user's body unless the finger is brought into contact with any other body site and a closed conductor path is formed. For this reason, the influence on the user's body is smaller than in cases where electrodes are used and thus it is possible to increase the amount of an electrical signal (amount of current) applied.

Therefore, according to the seventh to tenth wearable input devices 7 to 10, whether a finger is in or out of contact can be more accurately detected than with the technique for applying a signal to a user's body through electrodes.

Especially, when an electrical signal passed through a user's body is measured with a current sensor 223 as in the eighth embodiment, it is unnecessary to use an electrode also on the measurement side. This makes it possible to prevent the accuracy of detection of the contact or out-of-contact of a finger from being degraded due to improper contact between an electrode and the user's body.

The invention is not limited to the above seventh to tenth embodiments and can be variously embodies. In the above embodiments, it is checked where a command to be transmitted to an external device 2110 is changed depending on whether fingers are in or out of contact with each other have been taken as examples. The measurement values (voltage, current, impedance, and average power consumption) in the above embodiments are also varied by pressing force from fingers when the fingers are in contact with each other. Therefore, the control unit 217, 227, 237, 247 may be so configured as to change a command to be transmitted to the external device 2110 according to pressing force from the fingers.

FIGS. 31A and 31B illustrate the correspondence between contact pressure P provided when fingers are in contact with each other and measurement value. When a voltage V is measured as in the seventh embodiment, for example, the voltage V measured by the voltage measurement unit 214 is increased with an increase in contact pressure provided when the fingers are in contact with each other. When a current I is measured as in the eighth embodiment, the current I measured by the current sensor 223 is increased with an increase in pressure provided when the fingers are in contact with each other.

When an impedance Z is measured as in the ninth embodiment, the impedance Z measured by the impedance measurement unit 233 is decreased with an increase in pressure P obtained when the fingers are in contact with each other. When power W is measured as in the tenth embodiment, the average power consumption measured by the power measurement unit 243 is increased with an increase in pressure obtained when the fingers are in contact with each other.

Therefore, when the seventh to tenth wearable input devices 7 to 10 are so configured as to utilize this relation and transmit a command corresponding to pressing force from fingers to the external device 2110, more complicated remote operation can be implemented.

The measurement values in the above embodiments are also varied by the positional relation between the contact position of fingers and the seventh to tenth wearable input device 7 to 10. Therefore, the control unit 217, 227, 237, 247 may be so configured as to change a command to be transmitted to the external device 2110 by checking whether a user slides his/her finger away from or closer to the seventh to tenth wearable input devices 7 to 10 based on based on a measurement value.

FIGS. 32A and 32B illustrate the correspondence between slide direction and measurement value. When voltage V is measured as in the seventh embodiment, for example, it is expected that the voltage V measured by the voltage measurement unit 214 will be decreased as the contact position Y is shifted away from the device. When a current is measured as in the eighth embodiment, similarly, it is expected that the current I measured by the current sensor 223 will be decreased as the contact position is shifted away from the device.

When impedance Z is measured as in the ninth embodiment, it is expected that the impedance Z measured by the impedance measurement unit 233 will be increased as the contact position Y is shifted away from the device. When power W is measured as in the tenth embodiment, it is expected that the average power consumption measured by the power measurement unit 243 will be decreased as the contact position is shifted away from the device.

An input interface for operating the external device 2110 may be comprised of multiple wearable input devices 7 to 10.

The individual wearable input devices 7 to 10 comprising the input interface are so configured as to respectively transmit different commands to the external device 2110. These wearable input devices 7 to 10 comprising the input interface are worn on multiple fingers of a user. Thus a large number of commands can be transmitted to the external device 2110 by simple action of bringing fingers into or out of contact with each other.

The seventh wearable input device 7, 8 need not be configured as a single device but may be configured as devices divided by function. In the wearable input devices 7, 8, the magnetic body 211 and the signal supply unit 212 are electrically independent of the other constituent elements. Therefore, each of the wearable input devices 7, 8 may be divided into a first device comprised of the magnetic body 211 and the signal supply unit 212 and a second device comprised of the other constituent elements.

In this case, multiple first devices can be prepared for the second device so that alternating current signals different in frequency are applied from the first devices. The second device can be provided with a section for separating alternating current signals obtained through the measurement electrodes 213a, 213b or the current sensor 223 on a frequency-by-frequency basis. Thus multiple actions of bringing fingers into or out of contact can be detected by the second device and as a result, a larger number of commands can be transmitted to the external device 2110.

When the first device is worn on a thumb and the second device is worn on a forefinger and a middle finger, for example, a large number of commands can be transmitted to the external device 2110 by bringing the forefinger and the thumb into or out of contact with each other and bringing the middle finger and the thumb into or out of contact with each other.

In the above embodiments, commands are wirelessly outputted from the seventh to tenth wearable input device 7 to 10 to the external device 2110. Instead, the seventh to tenth wearable input device 7 to 10 may be so configured as to wiredly output commands to the external device 2110.

What is claimed is:

1. A wearable electrical apparatus comprising:
a signal supply section having a pair of ring-shaped signal electrodes configured to be wearable around a conductor path on a body surface of a user where a closed annular conductor path is formed by contact of two body sites that are brought into or out of contact with each other through the body surface, and configured to apply an electrical signal to the body site formed between the pair of signal electrodes so that a first closed ring formation site and a second ring formation site are formed, the first closed ring formation site being formed between the pair of the signal electrodes with intervention of a point of contact between the two body sites in a path along the conductor path when the two body sites are in contact with each other, and the second ring formation site being formed as the body site sandwiched between the pair of signal electrodes without the intervention of the point of contact;
a measuring section integrated with the signal supply section and configured to measure a physical parameter quantity of an electrical signal produced in the first closed ring formation side; and
a detecting section configured to detect that the two body sites are brought into or out of contact with each other by a user's body movement based on the physical parameter quantity of the electrical signal measured by the measuring section.

2. The wearable electrical apparatus of claim 1, wherein:
the measuring section is configured to measure a current produced in the first closed ring formation site as the physical parameter quantity of the electrical signal;
the detecting section is configured to detect the contact if a measurement value of current from the measuring section is higher than a predetermined threshold value and detect no contact if the measurement value of current from the measuring section is lower than the predetermined threshold value; and
the pair of signal electrodes are shaped to encircle the conductor path on the body surface.

3. The wearable electrical apparatus of claim 2, wherein:
wherein the measuring section includes an annular body for capturing magnetic flux provided in a position where the annular body is not interlinked with a first closed circuit formed by connecting electric circuits including the second closed ring formation site and the pair of signal electrodes of the signal supply section and through which the electrical signal flows when the two body sites are not in contact with each other and where the annular body is interlinked with a second closed circuit formed by connecting electric circuits including the first closed ring formation site and the pair of electrodes of the signal supply section and through which the electrical signal flows when the two body sites are in contact with each other; and
the measuring section is configured to measures the current produced in the first closed ring formation based on magnetic flux captured by the annular body.

4. The wearable electrical apparatus of claim 1, wherein:
the measuring section is configured to measure a voltage at a specific point in the first closed ring formation site as the physical parameter quantity of the electrical signal; and
the detecting section is configured to detect the contact or no contact based on a magnitude relation between a measurement value of the voltage from the measuring section and a predetermined threshold value.

5. The wearable electrical apparatus of claim 1, wherein:
the signal supply section is configured to apply an alternating current signal as the electrical signal to the pair of electrodes;
the measuring section is configured to measure, as the physical parameter quantity of the electrical signal, phase delay of an electrical signal produced at a specific point in the first closed ring formation site relative to the alternating current signal applied by the signal supply section; and
the detecting section is configured to detect the contact when the phase delay measured by the measuring section is higher than a predetermined threshold value and detect no contact when the phase delay measured by the measuring section is lower than the predetermined threshold value.

6. A wearable electrical apparatus comprising:
a signal supply section having a pair of ring-shaped signal electrodes configured to be wearable around a conductor path on a body surface of a user where a closed annular conductor path is formed by contact of two body sites that are brought into or out of contact with each other through the body surface, and configured to apply an electrical signal to the body site formed between the pair of signal electrodes so that a first closed ring formation site and a second ring formation site are formed, the first closed ring formation site being formed between the pair of the signal electrodes with intervention of a point of contact between the two body sites in a path along the conductor path when the two body sites are in contact with each other, and the second ring formation site being formed as the body site sandwiched between the pair of signal electrodes without the intervention of the point of contact;

a current measuring section integrated with the signal supply section and having a measurement electrode wearable on the surface of the first closed ring formation site and a line for connecting an electrode adjacent to the measurement electrode in a path along the conductor path without the point of contact between the two body sites present of the pair of signal electrodes of the signal supply section to the measurement electrode and for holding these electrodes at equal potential, and configured to measure a current flowing through the line; and a detecting section configured to detect that the two body sites are brought into or out of contact with each other by user's body movement based on a measurement value of current from the current measuring section.

7. The wearable electrical apparatus of claim 6, wherein:

the detecting section is configured to detect the contact when an impedance determined from a ratio of the current measured by the measuring section to a voltage between the pair of electrodes is lower than a predetermined threshold value and detects no contact when the impedance is higher than a predetermined threshold value; and the pair of signal electrodes are shaped to encircle the conductor path on the body surface.

8. The wearable electrical apparatus according to claim 6 further comprising:

an actuating signal outputting section configured to output an actuating signal corresponding to a user's body movement to an external device based on a result of detection by the detecting section.

9. A wearable electrical apparatus comprising:

a signal supply section having an annular magnetic body and a signal supply unit, the annular magnetic body being formed of an annular core and a coil wound around the annular core and provided as an annular body wearable on a body site of a user where a closed annular conductor path is formed by contact of two body sites that are brought into or out of contact with each other through a body surface so that a direction of circumference thereof is orthogonal to a direction of circumference of the conductor path, the signal supply unit supplying a current to the coil to produce a magnetic field in the direction of the circumference of the annular core and thereby producing an electrical signal in the direction of the circumference of the conductor path by electromagnetic induction with the conductor path formed;

a power consumption measuring section configured to measure at least either of a current flowing through the coil of the magnetic body and a voltage across the coil of the magnetic body and thereby measuring power consumption of the coil; and a detecting section configured to detect that two body sites are brought into or out of contact with each other by user's body movement based on the power consumption of the coil measured by the power consumption measuring section, wherein the detecting section is configured to detect a contact when the power consumption of the coil measured by the power consumption measuring section is higher than a predetermined threshold value and detect no contact when the power consumption of the coil measured by the power consumption measuring section is lower than the predetermined threshold value.

10. The wearable electrical apparatus of claim 9, further comprising:

an actuating signal outputting section configured to output an actuating signal corresponding to the user's body movement to an external device based on a result of detection by the detecting section.

11. The wearable electrical apparatus according to claim 1 further comprising:

an actuating signal outputting section configured to output an actuating signal corresponding to a user's body movement to an external device based on a result of detection by the detecting section.

12. The wearable electrical apparatus of claim 6, further comprising:

an actuating signal outputting section configured to output an actuating signal corresponding to the user's body movement to an external device based on a result of detection by the detecting section.

13. The wearable electrical apparatus of claim 1, wherein the measuring section is provided in parallel with and outside the signal supply section in a direction of the conductor path.

* * * * *